United States Patent
Yoda

(10) Patent No.: US 8,196,077 B2
(45) Date of Patent: Jun. 5, 2012

(54) CELL-LIBRARY-FOR-STATISTICAL-TIMING-ANALYSIS CREATING APPARATUS AND STATISTICAL-TIMING ANALYZING APPARATUS

(75) Inventor: Tomoyuki Yoda, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 332 days.

(21) Appl. No.: 12/685,066

(22) Filed: Jan. 11, 2010

(65) Prior Publication Data

US 2010/0242007 A1 Sep. 23, 2010

(30) Foreign Application Priority Data

Mar. 17, 2009 (JP) .................................. 2009-064675

(51) Int. Cl.
*G06F 17/50* (2006.01)
(52) U.S. Cl. .......................... 716/108; 716/106; 716/113
(58) Field of Classification Search .................. 716/106, 716/108, 113, 134, 136
See application file for complete search history.

(56) References Cited

U.S. PATENT DOCUMENTS

| 7,594,210 B2 * | 9/2009 | Becer et al. ................... 716/119 |
| 2008/0120584 A1 | 5/2008 | Becer et al. |
| 2009/0249272 A1 | 10/2009 | Yoda |
| 2010/0312176 A1 * | 12/2010 | Lauer et al. ..................... 604/66 |

FOREIGN PATENT DOCUMENTS

JP 2008-112406 5/2008

* cited by examiner

*Primary Examiner* — Vuthe Siek
(74) *Attorney, Agent, or Firm* — Turocy & Watson, LLP

(57) ABSTRACT

A cell-library-for-statistical-timing-analysis creating apparatus includes: a unit that groups cells into groups of cells each having the same topology; a unit that selects representative cells from the respective grouped cell group; a unit that sets one or more kinds of signal transition time information based on output signal transition time and input signal transition time; a unit that calculates, for each of the representative cells, an output load capacitance and input signal transition time for each of kinds of signal transition time information; a unit that executes circuit simulation using the output load capacitance and the input signal transition time and calculates a delay variation amount; a unit that calculates delay variation information based on a delay average and the delay variation amount; and a unit that outputs association for each of the representative cells between the signal transition time information and the delay variation information.

18 Claims, 14 Drawing Sheets

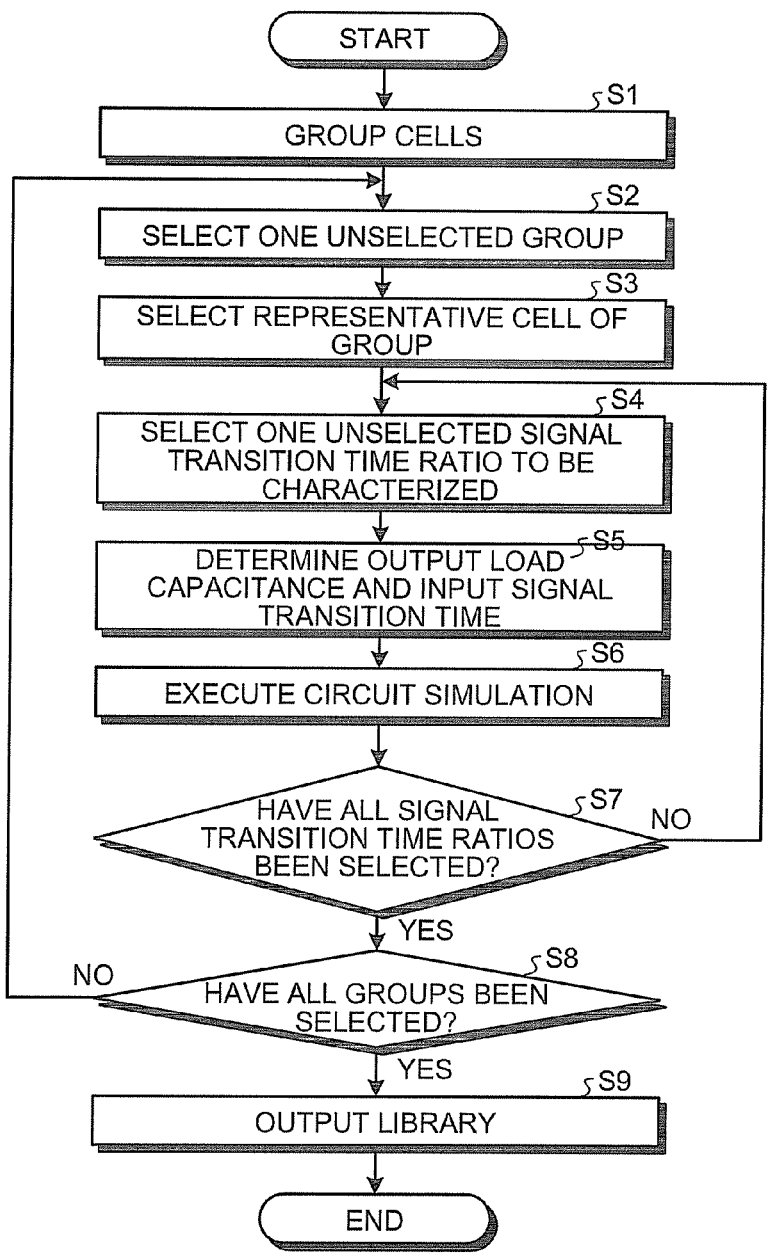

FIG.8A    FIG.8B    FIG.8C
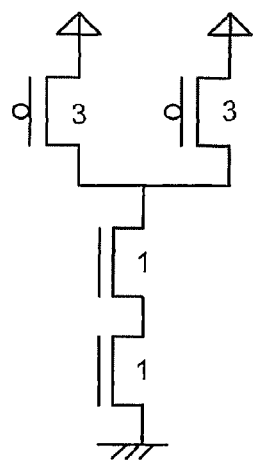
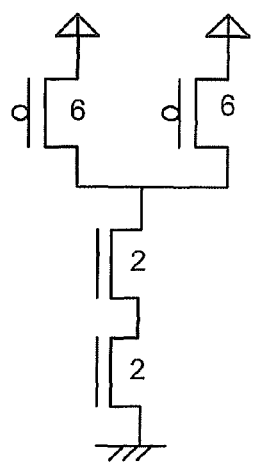
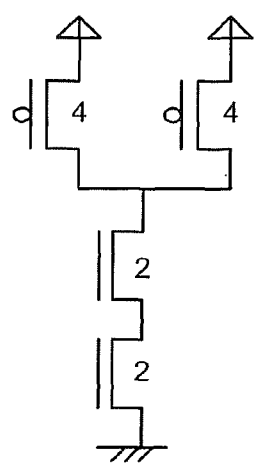
FIG.9A    FIG.9B    FIG.9C
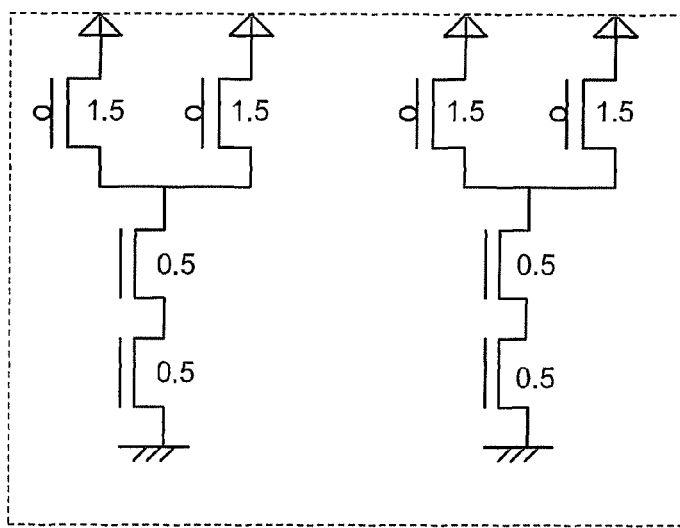
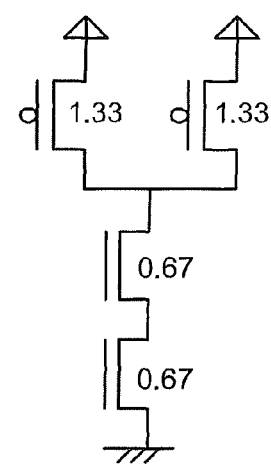
FIG.10
| GROUP NAME | CELL NAME |
|---|---|
| INV | INV 1   INV 2   INV 4 |
| NAND a | NAND 1   NAND 2 |
| NAND b | NAND 4 |
| NOR | NOR 1   NOR 2   NOR 4 |

INV [A→Z, RISE]

| SIGNAL TRANSITION TIME RATIO | VARIATION CAUSE | | |
|---|---|---|---|
| | L | W | Lth |
| 0.01 | 0.10 | 0.05 | 0.01 |
| 0.10 | 0.20 | 0.06 | 0.01 |
| 0.50 | 0.20 | 0.07 | 0.01 |
| 1.00 | 0.20 | 0.08 | 0.01 |
| 2.00 | 0.10 | 0.08 | 0.02 |
| 10.00 | 0.10 | 0.08 | 0.02 |
| 100.00 | 0.10 | 0.08 | 0.02 |

INV [A→Z, FALL]

| SIGNAL TRANSITION TIME RATIO | VARIATION CAUSE | | |
|---|---|---|---|
| | L | W | Lth |
| 0.01 | 0.10 | 0.05 | 0.01 |
| 0.10 | 0.20 | 0.06 | 0.01 |
| 0.50 | 0.20 | 0.07 | 0.01 |
| 1.00 | 0.20 | 0.08 | 0.01 |
| 2.00 | 0.10 | 0.08 | 0.02 |
| 10.00 | 0.10 | 0.08 | 0.02 |
| 100.00 | 0.10 | 0.08 | 0.02 |

FIG.11

NAND a [A→Z, RISE]

| SIGNAL TRANSITION TIME RATIO | VARIATION CAUSE | | |
|---|---|---|---|
| | L | W | Lth |
| 0.01 | 0.11 | 0.04 | 0.01 |
| 0.10 | 0.22 | 0.03 | 0.01 |
| 0.50 | 0.21 | 0.03 | 0.01 |
| 1.00 | 0.21 | 0.03 | 0.01 |
| 2.00 | 0.12 | 0.03 | 0.02 |
| 10.00 | 0.12 | 0.04 | 0.02 |
| 100.00 | 0.11 | 0.04 | 0.02 |

NAND a [A→Z, FALL]

| SIGNAL TRANSITION TIME RATIO | VARIATION CAUSE | | |
|---|---|---|---|
| | L | W | Lth |
| 0.01 | 0.11 | 0.04 | 0.01 |
| 0.10 | 0.22 | 0.03 | 0.01 |
| 0.50 | 0.21 | 0.03 | 0.01 |
| 1.00 | 0.21 | 0.03 | 0.01 |
| 2.00 | 0.12 | 0.03 | 0.02 |
| 10.00 | 0.12 | 0.04 | 0.02 |
| 100.00 | 0.11 | 0.04 | 0.02 |

NAND a [B→Z, RISE]

| SIGNAL TRANSITION TIME RATIO | VARIATION CAUSE | | |
|---|---|---|---|
| | L | W | Lth |
| 0.01 | 0.11 | 0.04 | 0.01 |
| 0.10 | 0.22 | 0.03 | 0.01 |
| 0.50 | 0.21 | 0.03 | 0.01 |
| 1.00 | 0.21 | 0.03 | 0.01 |
| 2.00 | 0.12 | 0.03 | 0.02 |
| 10.00 | 0.12 | 0.04 | 0.02 |
| 100.00 | 0.11 | 0.04 | 0.02 |

NAND a [B→Z, FALL]

| SIGNAL TRANSITION TIME RATIO | VARIATION CAUSE | | |
|---|---|---|---|
| | L | W | Lth |
| 0.01 | 0.11 | 0.04 | 0.01 |
| 0.10 | 0.22 | 0.03 | 0.01 |
| 0.50 | 0.21 | 0.03 | 0.01 |
| 1.00 | 0.21 | 0.03 | 0.01 |
| 2.00 | 0.12 | 0.03 | 0.02 |
| 10.00 | 0.12 | 0.04 | 0.02 |
| 100.00 | 0.11 | 0.04 | 0.02 |

FIG.18

INV [A→Z, RISE]
DELAY AVERAGE

| SIGNAL | OUTPUT LOAD CAPACITANCE | | |
| TRANSITION TIME | 1 fF | 10 fF | 100 fF |
| --- | --- | --- | --- |
| 100 ps | 10 | 100 | 900 |
| 500 ps | 15 | 150 | 1200 |
| 1000 ps | 20 | 200 | 1300 |

DELAY VARIATION AMOUNT [L]

| SIGNAL | OUTPUT LOAD CAPACITANCE | | |
| TRANSITION TIME | 1 fF | 10 fF | 100 fF |
| --- | --- | --- | --- |
| 100 ps | 1 | 10 | 150 |
| 500 ps | 3 | 12 | 160 |
| 1000 ps | 5 | 15 | 170 |

DELAY VARIATION AMOUNT [W]

| SIGNAL | OUTPUT LOAD CAPACITANCE | | |
| TRANSITION TIME | 1 fF | 10 fF | 100 fF |
| --- | --- | --- | --- |
| 100 ps | 2 | 12 | 150 |
| 500 ps | 5 | 14 | 160 |
| 1000 ps | 6 | 17 | 170 |

DELAY VARIATION AMOUNT [Vth]

| SIGNAL | OUTPUT LOAD CAPACITANCE | | |
| TRANSITION TIME | 1 fF | 10 fF | 100 fF |
| --- | --- | --- | --- |
| 100 ps | 1 | 3 | 15 |
| 500 ps | 1 | 5 | 21 |
| 1000 ps | 2 | 5 | 25 |

INV [A→Z, FALL]
DELAY AVERAGE

| SIGNAL | OUTPUT LOAD CAPACITANCE | | |
| TRANSITION TIME | 1 fF | 10 fF | 100 fF |
| --- | --- | --- | --- |
| 100 ps | 10 | 100 | 900 |
| 500 ps | 15 | 150 | 1200 |
| 1000 ps | 20 | 200 | 1300 |

DELAY VARIATION AMOUNT [L]

| SIGNAL | OUTPUT LOAD CAPACITANCE | | |
| TRANSITION TIME | 1 fF | 10 fF | 100 fF |
| --- | --- | --- | --- |
| 100 ps | 1 | 10 | 150 |
| 500 ps | 3 | 12 | 160 |
| 1000 ps | 5 | 15 | 170 |

DELAY VARIATION AMOUNT [W]

| SIGNAL | OUTPUT LOAD CAPACITANCE | | |
| TRANSITION TIME | 1 fF | 10 fF | 100 fF |
| --- | --- | --- | --- |
| 100 ps | 2 | 12 | 150 |
| 500 ps | 5 | 14 | 160 |
| 1000 ps | 6 | 17 | 170 |

DELAY VARIATION AMOUNT [Vth]

| SIGNAL | OUTPUT LOAD CAPACITANCE | | |
| TRANSITION TIME | 1 fF | 10 fF | 100 fF |
| --- | --- | --- | --- |
| 100 ps | 1 | 3 | 15 |
| 500 ps | 1 | 5 | 21 |
| 1000 ps | 2 | 5 | 25 |

CELL-LIBRARY-FOR-STATISTICAL-TIMING-ANALYSIS CREATING APPARATUS AND STATISTICAL-TIMING ANALYZING APPARATUS

CROSS-REFERENCE TO RELATED APPLICATIONS

This application is based upon and claims the benefit of priority from the prior Japanese Patent Application No. 2009-64675, filed on Mar. 17, 2009; the entire contents of which are incorporated herein by reference.

BACKGROUND OF THE INVENTION

1. Field of the Invention

The present invention relates to a cell-library-for-statistical-timing-analysis creating apparatus and a statistical-timing analyzing apparatus.

2. Description of the Related Art

In recent years, microminiaturization of semiconductor integrated circuits has been advanced and delay variation due to manufacturing variation tends to increase according to the advance in the microminiaturization. Therefore, timing analysis with the delay variation accurately taken into account is becoming necessary and indispensable.

As a method of efficiently performing the timing analysis with the delay variation accurately taken into account, there is a statistical timing analysis. A cell library for statistical timing analysis is necessary to execute the statistical timing analysis. However, time required for creating the library is extremely long.

To cope with this problem, a plurality of methods of reducing library creation time have been proposed. For example, Japanese Patent Application Laid-Open No. 2008-112406 discloses a method of dividing a cell into a plurality of partial circuits and performing characterization for each of the partial circuits. In this method, when the same partial circuit is included in a plurality of cells, the partial circuit only has to be characterized once. Therefore, characterization time can be reduced. For example, each of an AND gate with one-fold driving force and an AND gate with four-fold driving force can be divided into two partial circuits in a pre-stage and a post-stage. However, since partial circuits in pre-stages of the AND gates are the same, when the AND gate with one-fold driving force is characterized, characterization for the pre-stage of the AND gate with four-fold driving force is unnecessary.

However, according to the technology disclosed in Japanese Patent Application Laid-Open No. 2008-112406, the characterization time can be reduced only for cells having completely the same partial circuit. Therefore, the effect of the reduction in the characterization time is limited. For example, usually, inverter gates with one-fold driving force, two-fold driving force, and four-fold driving force cannot be divided into smaller partial circuits. Therefore, the characterization time cannot be reduced by this method.

As another method of reducing the characterization time, United States Patent Application Publication No. 2008/0120584 discloses a method of causing a delay variation ratio $f=\sigma/\mu$, which is obtained by dividing the delay variation amount by average delay time, to represent a delay variation amount to thereby collectively characterize partial circuits having the same topology once. In this method, because inverter gates with one-fold driving force, two-fold driving force, and four-fold driving force have the same topology, the inverter gates can be collectively characterized once. Therefore, the library creation time can be reduced.

However, according to the technology disclosed in United States Patent Application Publication No. 2008/0120584, the delay variation ratio cannot be accurately characterized. In this technology, a single-value delay variation ratio is calculated for each of cells. However, in general, the delay variation ratio is different depending on input signal transition time and an output load capacitance of a cell. Therefore, when the delay variation ratio is represented by a single value, an error is large. Further, even in partial circuits having the same topology, the delay variation ratio is substantially different if driving force is different. Therefore, in this respect, an error is also large in a library by the technology disclosed in United States Patent Application Publication No. 2008/0120584.

BRIEF SUMMARY OF THE INVENTION

A cell-library-for-statistical-timing-analysis creating apparatus according to an embodiment of the present invention comprises:

a group determining unit that groups cells as statistical timing analysis targets into groups of cells each having same topology;

a representative-cell selecting unit that selects representative cells from the respective grouped cell groups;

a signal-transition-time-information determining unit that sets one or more kinds of signal transition time information based on output signal transition time as transition time of an output signal from a cell and input signal transition time as transition time of an input signal to the cell;

an output-load-capacitance/input-signal-transition-time determining unit that calculates, based on the set signal transition time information and a cell library for static timing analysis, for each of the selected representative cells, an output load capacitance and input signal transition time for each of the set kinds of signal transition time information to be used for circuit simulation;

a circuit-simulation executing unit that executes the circuit simulation using the calculated output load capacitance and input signal transition time and calculates a delay variation amount;

a delay-variation-information calculating unit that calculates delay variation information based on a delay average and the delay variation amount calculated by the circuit simulation; and a library output unit that outputs, as a cell library for statistical timing analysis, association for each of the representative cells between the signal transition time information and the delay variation information.

A statistical-timing analyzing apparatus according to an embodiment of the present invention comprises:

a net-delay analyzing unit that calculates, for each of nets forming a path, a delay average and a delay variation amount of a cell arranged in a pre-stage of the net; and a path-delay analyzing unit that calculates a path delay of the path based on the delay average and the delay variation amount calculated for each of the nets, wherein the net-delay analyzing unit includes:

a net selecting unit that selects a net forming the path;

a delay-average/output-signal-transition-time calculating unit that calculates a delay average and output signal transition time referring to a cell library for static timing analysis with input signal transition time to a cell arranged in a pre-stage of the selected net and an output load capacitance of the cell set as search keys;

a signal-transition-time-ratio calculating unit that divides the calculated output signal transition time by the input signal transition time to calculate a signal transition time ratio;

a delay-variation-ratio calculating unit that calculates a delay variation ratio referring to a cell library for statistical timing analysis with the calculated signal transition time ratio set as a search key; and a delay-variation-amount calculating unit that multiplies the calculated delay average and the calculated delay variation ratio together to calculate a delay variation amount, wherein the cell library for statistical timing analysis is created by a cell-library-for-statistical-timing-analysis creating apparatus including:

a group determining unit that groups cells as statistical timing analysis targets into groups of cells each having same topology;

a representative-cell selecting unit that selects representative cells from the respective grouped cell groups;

a signal-transition-time-information determining unit that sets one or more signal transition time ratios as ratios of the input signal transition time and the output signal transition time;

an output-load-capacitance/input-signal-transition-time determining unit that calculates, based on the signal transition time ratios set by the signal-transition-time-information determining unit and the cell library for static timing analysis, for each of the selected representative cells, an output load capacitance and input signal transition time for each of the set signal transition time ratios to be used for circuit simulation;

a circuit-simulation executing unit that executes the circuit simulation using the output load capacitance and the input signal transition time calculated by the output-load-capacitance/input-signal-transition-time determining unit and calculates a delay variation amount;

a delay-variation-information calculating unit that calculates a delay variation ratio as a ratio of the delay variation amount calculated by the circuit-simulation executing unit and the delay average; and a library output unit that outputs, as the cell library for statistical timing analysis, association for each of the representative cells between the signal transition time ratio and the delay variation ratio calculated by the delay-variation-information calculating unit.

A statistical-timing analyzing apparatus according to an embodiment of the present invention comprises:

a cell-library-for-statistical-timing-analysis creating unit that creates a first cell library for statistical timing analysis, which outputs a delay variation amount with the input signal transition time and the output load capacitance set as search keys, using a second cell library for statistical timing analysis created by a cell-library-for-statistical-timing-analysis including: a group determining unit that groups cells as statistical timing analysis targets into groups of cells each having same topology; a representative-cell selecting unit that selects representative cells from the respective grouped cell groups; a signal-transition-time-information determining unit that sets one or more signal transition time ratios as ratios of input signal transition time as transition time of an input signal to a cell and output signal transition time of an output signal from the cell; an output-load-capacitance/input-signal-transition-time determining unit that calculates, based on the set signal transition time ratios and a cell library for static timing analysis, for each of the selected representative cells, an output load capacitance and input signal transition time for each of the set signal transition time ratios to be used for circuit simulation; a circuit-simulation executing unit that executes the circuit simulation using the calculated output load capacitance and input signal transition time and calculates a delay variation amount; a delay-variation-information calculating unit that calculates a delay variation ratio as a ratio of the delay variation amount calculated by the circuit simulation and the delay average; and a library output unit that outputs, as the second cell library for statistical timing analysis, association for each of the representative cells between the signal transition time ratio and the delay variation ratio; and a statistical-timing-analysis executing unit that executes statistical timing analysis based on the first cell library for statistical timing analysis, wherein the cell-library-for-statistical-timing-analysis creating unit includes:

an input-signal-transition-time/output-load-capacitance setting unit that selects one input signal transition time and one output load capacitance out of a plurality of input signal transition times and a plurality of output load capacities, respectively;

a delay-average/output-signal-transition-time calculating unit that calculates a delay average and output signal transition time referring to the cell library for static timing analysis with the input signal transition time and the output load capacitance selected by the input-signal-transition-time/output-load-capacitance setting unit set as search keys;

a signal-transition-time-ratio calculating unit that divides the output signal transition time calculated by the delay-average/output-signal-transition-time calculating unit by the input signal transition time selected by the input-signal-transition-time/output-load-capacitance setting unit to calculate a signal transition time ratio;

a delay-variation-ratio calculating unit that calculates a delay variation ratio referring to the second cell library for statistical timing analysis with the signal transition time ratio calculated by the signal-transition-time-ratio calculating unit set as a search key; and a delay-variation-amount calculating unit that multiplies the delay average calculated by the delay-average/output-signal-transition-time calculating unit and the delay variation ratio calculated by the delay-variation-ratio calculating unit together to calculate a delay variation amount.

BRIEF DESCRIPTION OF THE DRAWINGS

FIG. 6 is a flowchart for explaining a cell-library-for-statistical-timing-analysis creating method according to the first embodiment;

FIG. 7 is a diagram of an example of variation information;

FIG. 8 is a diagram of an example of element connection information of a NAND gate;

FIG. 9 is a diagram of an example of element connection information of the NAND gate after normalization;

FIG. 10 is a diagram of an example of group information;

FIG. 11 is a diagram of an example of delay variation ratio information;

FIG. 18 is a diagram of an example of delay variation amount information.

DETAILED DESCRIPTION OF THE INVENTION

Exemplary embodiments of a cell-library-for-statistical-timing-analysis creating apparatus and a statistical-timing analyzing apparatus according to the present invention will be explained below in detail with reference to the accompanying drawings. The present invention is not limited to the following embodiments.

To facilitate understanding, a difference between a cell library for statistical timing analysis according to a first embodiment of the present invention and a prototype of the first embodiment devised by the inventor is schematically explained with reference to FIGS. 1, 2, 3, and 4. The prototype is referred to as a cell library for statistical timing analysis according to a comparative example.

A cell library for performing statistical timing analysis includes delay average information for calculating a delay average and a cell library for statistical timing analysis for calculating a delay variation amount as variation of delay time from the delay average. Both the delay average information and the cell library for statistical timing analysis according to the comparative example are formed in a table format with input signal transition time and an output load capacitance set as search keys. The delay average information is a cell library generally used in static timing analysis. It is possible to perform, by adding delay variation amount information to the delay average information which is generally used in static timing analysis, timing analysis with delay variation due to manufacturing variation taken into account, i.e., statistical timing analysis.

Figure 1:
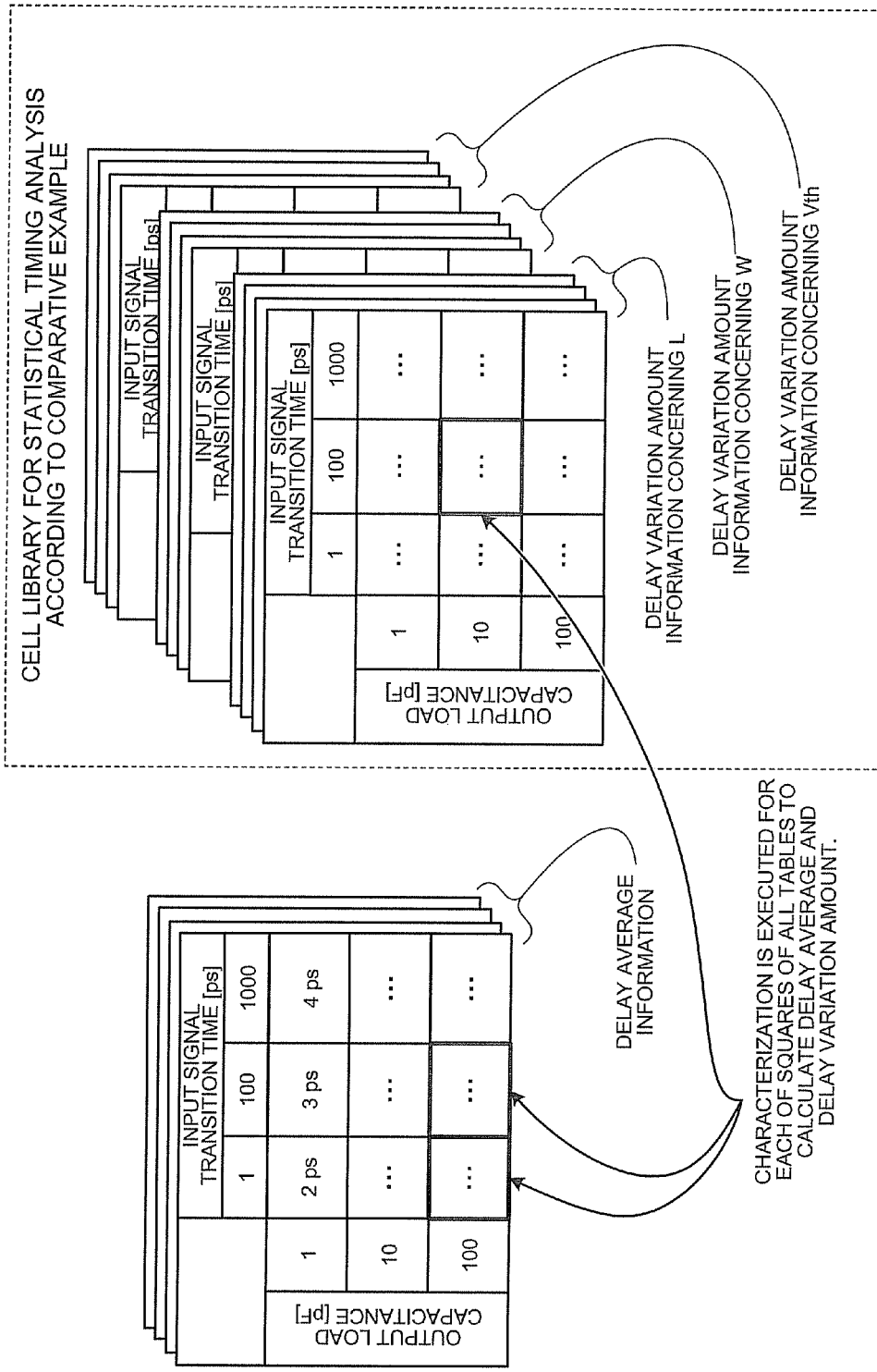
FIG. 1 is a diagram for conceptually explaining a cell library for statistical timing analysis according to a comparative example.

FIG. 1 is a conceptual diagram of an example of the delay average information and delay variation amount information as the cell library for statistical timing analysis according to the comparative example. As shown in the figure, a delay average can be calculated from the delay average information and a delay variation amount can be calculated from the delay variation amount information based on three kinds of input signal transition time and three kinds of output load capacities. The delay variation amount information is prepared for each of types of variation. In this example, delay variation amount information based on variation of gate length L, delay variation amount information based on variation of gate width W and delay variation amount information based on variation of threshold voltage Vth are prepared. The delay variation amount can be any amount as long as the amount can define variation from an average. It is assumed that a standard deviation is used as the delay variation amount. The delay variation amount can be half width at half maximum, full width at half maximum, or the like. Delay time is calculated by using, for one cell, one set including one table of the delay average information and one table of the delay variation amount information concerning each of L, W, and Vth. For a plurality of cells having completely the same structure, delay time can be predicted by using the same set. In the example shown in FIG. 1, four sets are prepared.

To create the delay average information and the delay variation amount information, circuit simulation (characterization) by circuit simulation software such as SPICE is executed for each of squares in all of the tables and work for calculating a delay average and a delay variation amount is executed. According to the example shown in FIG. 1, sixteen (4×4) tables including nine (three kinds (input signal transition time)×three kinds (output load capacities)) squares are included. Therefore, to create the cell library shown in FIG. 1, characterization has to be performed 144 (9×16) times in total. When variations of conditions of search keys are set larger than 3×3 kinds to improve prediction accuracy for delay time, the necessary number of times of characterization increases in proportion to the number of variations. When types of variation such as thickness variation of a gate oxide film are increased, the number of times of characterization increases according to the increase in the types. Because a large number of times of characterization is necessary in this way, long time is required for creation of the cell library according to the comparative example.

Figure 2:
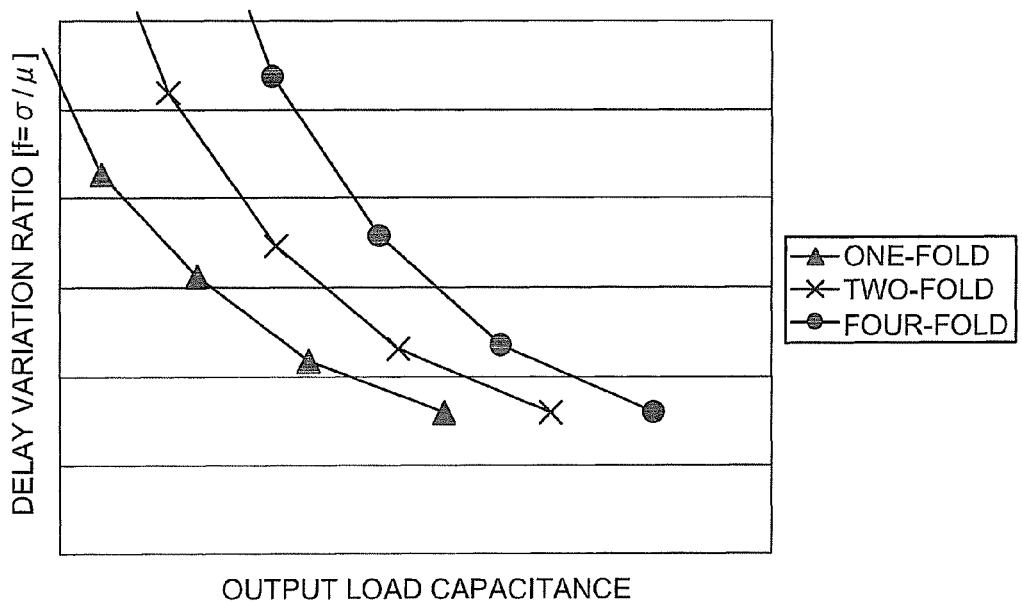
FIG. 2 is a graph of a relation between an output load capacitance and a delay variation ratio.

According to the technology disclosed in United States Patent Application Publication No. 2008/0120584, it is possible to cause a single value to represent information concerning each of tables of delay variation amount information and use the same set to calculate delay amounts of a plurality of cells having the same topology by causing a delay variation ratio $f = \sigma$ (standard deviation of delay variation)/$\mu$ (delay average) to represent a delay variation amount. Therefore, the necessary number of times of characterization is successfully reduced substantially. However, the delay variation ratio is different depending on input signal transition time and an output load capacitance of a cell. Therefore, when a single value is caused to represent the delay variation ratio as in the technology disclosed in United States Patent Application Publication No. 2008/0120584, an error is large. Even in partial circuits having the same topology, the delay variation ratio is substantially different if driving force is different. Therefore, in this respect, an error is also large in a library by the technology disclosed in United States Patent Application Publication No. 2008/0120584. FIG. 2 is a graph of a measurement result of a delay variation ratio of cells having the same topology. As shown in the figure, it is seen that the delay variation ratio takes a substantially different value depending on driving force and an output load capacitance even in the cells having the same topology.

Figure 3:
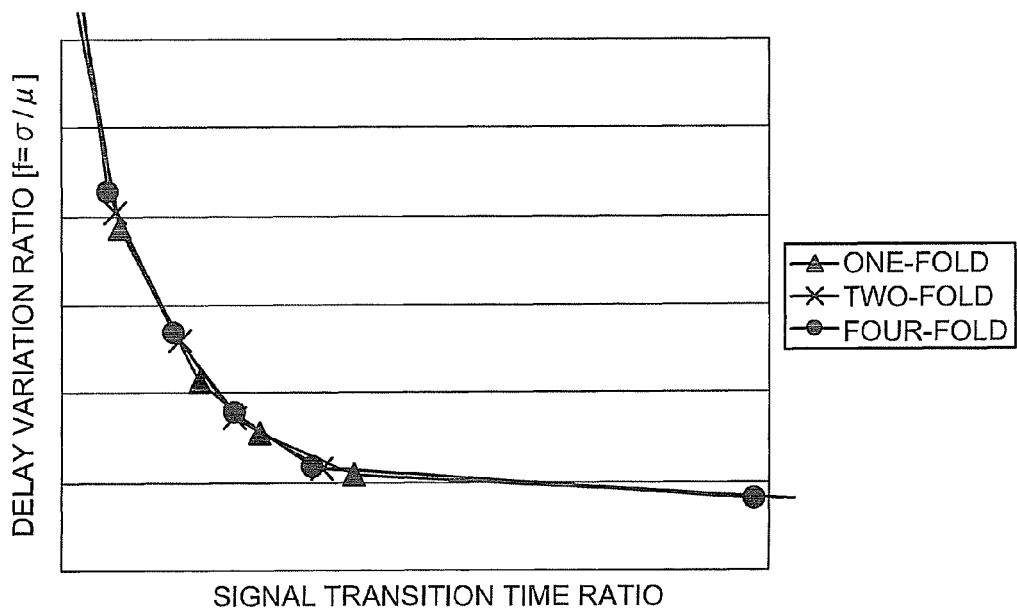
FIG. 3 is a graph of a relation between a signal transition time ratio and the delay variation ratio.

The inventor of the present invention found out, by repeating logical studies and actual circuit simulation, that a relation between a value (a signal transition time ratio) obtained by dividing output signal transition time by input signal transition time and a value (a delay variation ratio) obtained by dividing a delay variation amount by an delay average was substantially the same in cells having the same topology. FIG. 3 is a graph of a relation between the signal transition time ratio and the delay variation ratio. As shown in the figure, it is seen that, even when driving force is different in the same topology, the relation between the signal transition time ratio and the delay variation ratio is substantially the same. In the first embodiment, the relation between the signal transition time ratio and the delay variation ratio is represented as a cell library for statistical timing analysis.

Figure 4:
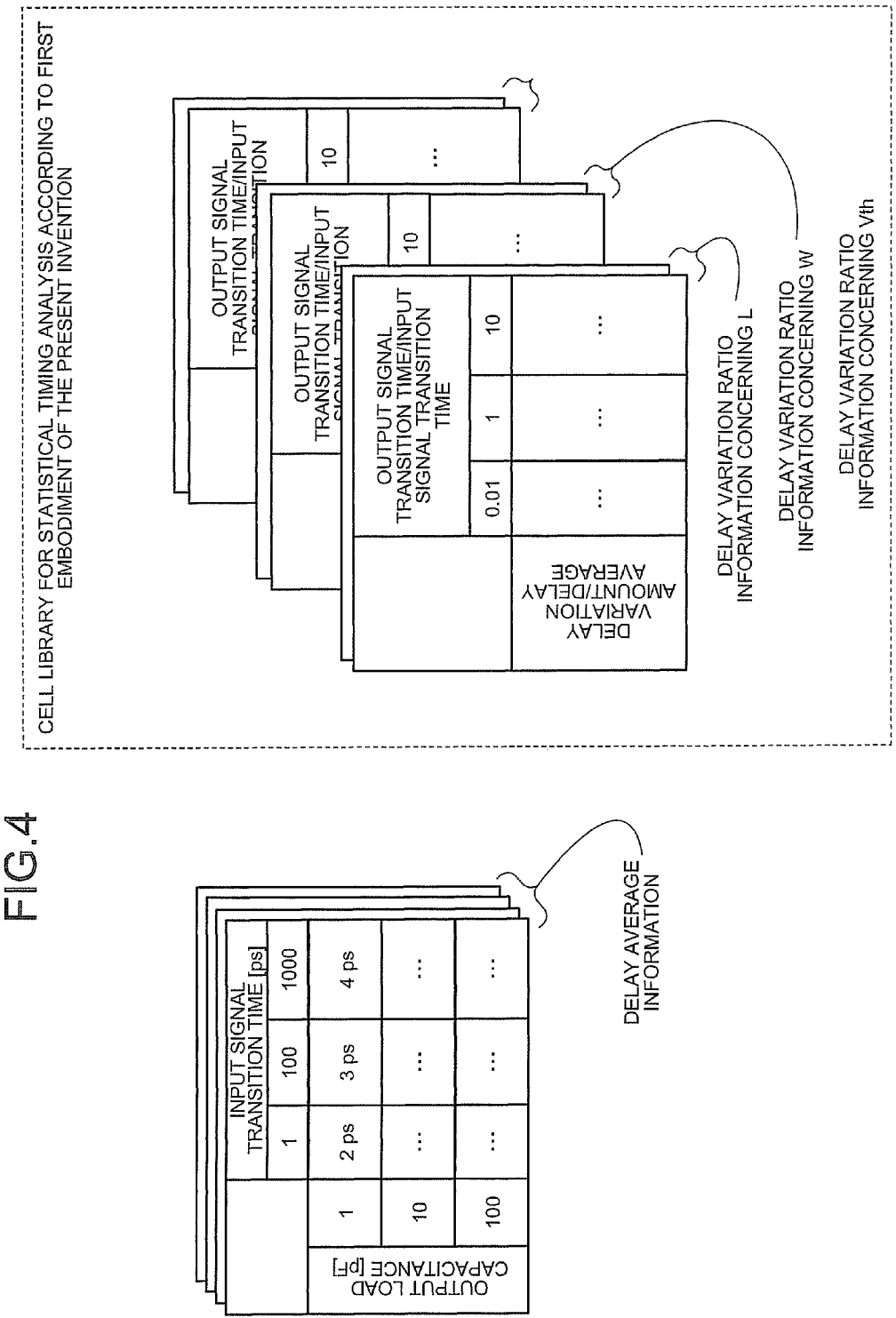
FIG. 4 is a diagram for conceptually explaining a cell library for statistical timing analysis according to a first embodiment of the present invention.

FIG. 4 is a conceptual diagram for explaining examples of delay average information and a cell library for statistical timing analysis according to the first embodiment. As shown in the figure, the cell library for statistical timing analysis according to the first embodiment includes delay variation ratio information concerning L, delay variation ratio information concerning W, and delay variation information concerning Vth. The delay variation ratio information is a table group indicating the relation between the signal transition time ratio and the delay variation ratio as explained above. To calculate a delay variation amount from this table, it is sufficient to calculate a delay average and output signal transition time from an output load capacitance and input signal transition time according to static timing analysis, calculate a signal transition time ratio from the calculated output signal transition time, search through the cell library for statistical timing analysis with the calculated signal transition time ratio set as a search key to calculate a delay variation ratio, and multiply the calculated delay variation ratio with the calculated delay average.

As shown in FIG. 4, the cell library for statistical timing analysis is managed as a one-dimensional table in the first embodiment, whereas the cell library for statistical timing analysis is managed as a two-dimensional table in the comparative example. Consequently, the necessary number of times of characterization is reduced. Because the same delay variation ratio information can be used for cells having the same topology, the number of tables is reduced. In this case, the four cell libraries for statistical timing analysis prepared for each of the variation types in the comparative example are reduced to two for each of the variation types. Consequently, the necessary number of times of characterization is further reduced. In other words, creation time for the cell library for statistical timing analysis according to the first embodiment is substantially reduced compared with the cell library according to the comparative example. It is possible to perform highly accurate statistical timing analysis using the cell library for statistical timing analysis compared with the cell library disclosed in United States Patent Application Publication No. 2008/0120584.

Figure 5:
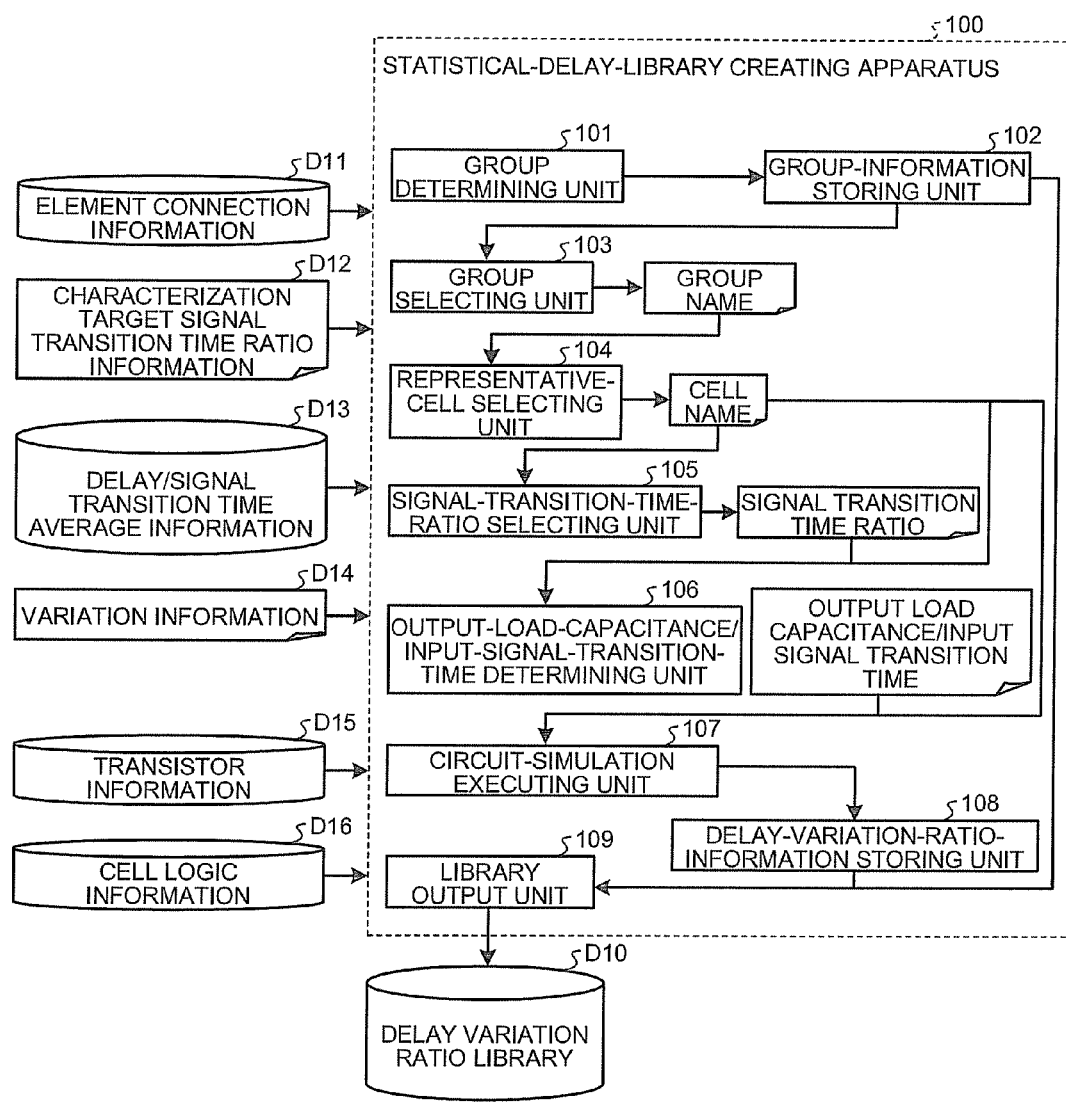
FIG. 5 is a block diagram of the configuration of a cell-library-for-statistical-timing-analysis creating apparatus according to the first embodiment.

FIG. 5 is block diagram of the configuration of a cell-library-for-statistical-timing-analysis creating apparatus 100 for creating the cell library for statistical timing analysis according to the first embodiment explained above. The cell-library-for-statistical-timing-analysis creating apparatus 100 according to the first embodiment receives the input of element connection information D11, characterization target signal transition time ratio information D12, delay/signal transition time average information D13, variation information D14, transistor information D15, and cell logic information D16 and outputs a delay variation ratio library D10 as the cell library for statistical timing analysis explained above.

The element connection information D11 is connection information concerning a transistor and parasitic elements (a resistor and a capacitor) in a cell, for example, a SPICE netlist.

The characterization target signal transition time ratio information D12 is a list of signal transition time ratios as characterization targets, for example, a number sequence such as 0.01, 0.10, 0.50, 1.0, 2.0, 10.0, and 100.0. The signal transition time ratio is, as explained above, the value obtained by dividing the output signal transition time of the cell by the input signal transition time. For example, when the output signal transition time is 100 picoseconds and the input signal transition time is 50 picoseconds, the signal transition time ratio is 2.0.

The delay/signal transition time average information D13 is a collection of the delay average information and the signal transition time average information. The signal transition time average information is a table group from which an output signal transition time average (output signal transition time) can be calculated with search keys same as those of the delay average information, i.e., the output load information and the input signal transition time. The delay/signal transition time average information D13 is information used in normal static timing analysis. In the first embodiment, the delay/signal transition time average information D13 in a cell library for static timing analysis is directly used.

The variation information D14 is variation amounts of variation causes of the transistor, for example, a table of a relation between variation causes (variation types) and variation amounts shown in FIG. 7. In an example shown in FIG. 7, variation causes L, W, and Vth are defined. Values of a standard deviation 1σ are 0.1 nanometer, 0.2 nanometer, and 10 millivolts. Any variation causes can be defined. Besides, the thickness of a gate oxide film or the like can be added.

The transistor information D15 is information concerning an electric characteristic of the transistor, for example, a SPICE transistor model.

The cell logic information D16 is information concerning a digital logic of the cell, for example, a logical expression of the cell. In general, like the delay/signal transition time average information D13, the cell logic information D16 is also described in the delay library for static timing analysis. In this embodiment, the cell logic information D16 described in the delay library for static timing analysis is directly used.

The cell-library-for-statistical-timing-analysis creating apparatus 100 includes, as components for creating and outputting the delay variation ratio library D10 as the cell library for statistical timing analysis according to the first embodiment from the input information, a group determining unit 101, a group-information storing unit 102, a group selecting unit 103, a representative-cell selecting unit 104, a signal-transition-time-ratio selecting unit 105, an output-load-capacitance/input-signal-transition-time determining unit 106, a circuit-simulation executing unit 107, a delay-variation-ratio-information storing unit 108, and a library output unit 109.

FIG. 6 is a flowchart for explaining a cell-library-for-statistical-timing-analysis creating method executed by the cell-library-for-statistical-timing-analysis creating apparatus 100. The operation of the cell-library-for-statistical-timing-analysis creating apparatus 100 is explained with reference to the flowchart.

First, the group determining unit 101 collects, based on the element connection information D11, cells having the same type of transistor connection and an equal transistor size ratio as one group to thereby group the cells (step S1). The cells having the same type of transistor connection are cells, transistor connections of which completely coincide with one another, like three cells (a) to (c) shown in FIG. 8. The cells having the equal transistor size ratio are cells, size ratios of corresponding transistors of which coincide with each other in all the transistors. It is possible to easily determine, by normalizing transistor sizes of the cells, whether the size ratios are equal. As a method of normalizing the transistor sizes, for example, there is a method of dividing all the transistors by an average size of the transistors in the cell. For example, when transistors of the three cells (a) to (c) shown in FIG. 8 are normalized, three cells (a) to (c) shown in FIG. 9 are obtained. As shown in the figure, in the cell (a) and the cell (b), transistor sizes after the normalization completely coincide with each other. Therefore, the cell (a) and the cell (b) are the cells having the equal transistor size ratio. On the other hand, the cell (b) and the cell (c) have different transistor sizes after the normalization. Therefore, the cell (b) and the cell (c) are not the cells having the equal transistor size ratio. The group-information storing unit 102 stores group information determined by the group determining unit 101. The group information is a table indicating a correspondence relation between group names and cell names, for example, as shown in FIG. 10.

Subsequently, the group selecting unit 103 selects one group out of the groups stored in the group-information storing unit 102 (step S2). Steps S2 to S8 form a loop for executing processing at steps S3 to S7 on the selected group. However, at step S2, unselected groups, i.e., groups on which the processing at steps S3 to S7 is not executed are sequentially selected.

Subsequently, the representative-cell selecting unit 104 selects one cell as a representative cell out of groups selected by the group selecting unit 103 (step S3). As the representative cell, a cell for which characterization is easiest among the groups, for example, a cell having a smallest transistor size among the groups is selected.

Subsequently, the signal-transition-time-ratio selecting unit 105 selects one signal transition time ratio out of the signal transition time ratios stored in the characterization target signal transition time ratio information D12 (step S4). At steps S4 to S7, a loop for performing processing at steps S5 and S6 is formed for each of the signal transition time ratios. At step S4, unselected signal transition time ratios, i.e., signal transition time ratios on which the processing at steps S5 and S6 is not executed yet are sequentially selected out of the signal transition time ratios stored in the characterization target signal transition time ratio information D12.

Subsequently, the output-load-capacitance/input-signal-transition-time determining unit 106 determines an output load capacitance and input signal transition time from the cell selected by the representative-cell selecting unit 104, the signal transition time ratio selected by the signal-transition-time-ratio selecting unit 105, and the delay/signal transition time average information D13 (step S5).

In this step, specifically, the output load capacitance and the input signal transition time are determined, for example, as explained below. First, input signal transition time $Slew_{in}$ and output signal transition time $Slew_{out}$ are determined. The input signal transition time $Slew_{in}$ and the output signal transition time $Slew_{out}$ are determined from a signal transition time ratio $Slew_{ratio}$ to satisfy the following formula:

$$Slew_{ratio} = Slew_{out}/Slew_{in} \quad (1)$$

$Slew_{in}$ and $Slew_{out}$ have to be equal to or smaller than maximum signal transition time limit $Slew_{limit}$ of a circuit. As a method of determining such $Slew_{in}$ and $Slew_{out}$, for example, there is a method of using the following formulas:

$$Slew_{in} = Slew_{limit}, Slew_{out} = Slew_{ratio} * Slew_{in}$$
$$(\text{if } Slew_{ratio} < 1) \quad (2)$$

$$Slew_{out} = Slew_{limit}, Slew_{in} = Slew_{out}/Slew_{ratio}$$
$$(\text{if } Slew_{ratio} \geq 1) \quad (3)$$

An output load capacitance $C_{load}$ is determined. The output load capacitance $C_{load}$ is determined by using the signal transition time average information of the delay/signal transition time average information D13. For example, the output load capacitance $C_{load}$ with which the output signal transition time is $Slew_{out}$ when input signal transition time is $Slew_{in}$ in binary search is determined.

Following step S5, the circuit-simulation executing unit 107 performs circuit simulation using a cell name, the element connection information D11, the variation information D14, the transistor information D15, the cell logic information D16, and the calculated output load capacitance and input signal transition time and calculates a delay variation ratio (step S6). The circuit simulation is executed by, for example, SPICE Monte Carlo simulation. The circuit-simulation executing unit 107 calculates a delay average and a delay variation amount for each of cells in the SPICE Monte Carlo simulation. The circuit-simulation executing unit 107 outputs a value obtained by dividing the delay variation amount by the delay average for each of the cells as a delay variation ratio for each of the cells.

The delay-variation-ratio-information storing unit 108 stores the cell delay variation ratio output from the circuit-simulation executing unit 107. The delay variation ratio is stored, for example, in a form shown in FIG. 11 and stored by group, signal transition direction, input and output terminal, signal transition time ratio, and variation cause.

Thereafter, the signal-transition-time-ratio selecting unit 105 determines whether all the signal transition time ratios have been selected (step S7). When all the signal transition time ratios have not been selected ("No" at step S7), the operation shifts to step S4. When the signal-transition-time-ratio selecting unit 105 determines that all the signal transition time ratios have been selected ("Yes" at step S7), the operation shifts to step S8. The group selecting unit 103 determines whether all the groups stored in the group-information storing unit 102 have been selected (step S8). When there is an unselected group ("No" at step S8), the operation shifts to step S2. When all the groups have already been selected ("Yes" at step S8), the library output unit 109 outputs, as the delay variation ratio library D10, the group information stored in the group-information storing unit 102 and the delay variation ratios stored in the delay-variation-ratio-information storing unit 108 (step S9).

Figure 12:
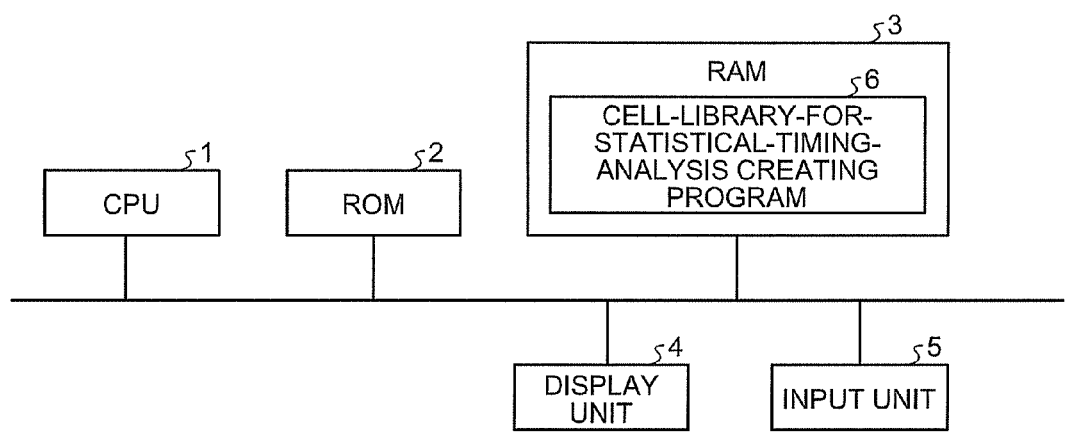
FIG. 12 is a diagram for explaining the hardware configuration of the cell-library-for-statistical-timing-analysis creating apparatus according to the first embodiment.

The cell-library-for-statistical-timing-analysis creating apparatus 100 explained above can be realized by a computer having a normal hardware configuration. FIG. 12 is a diagram of the hardware configuration of the cell-library-for-statistical-timing-analysis creating apparatus 100. The cell-library-for-statistical-timing-analysis creating apparatus 100 includes a central processing unit (CPU) 1, a read only memory (ROM) 2, a random access memory (RAM) 3, a display unit 4, and an input unit 5. In the cell-library-for-statistical-timing-analysis creating apparatus 100, the CPU 1, the ROM 2, the RAM 3, the display unit 4, and the input unit 5 are connected via a bus line.

The CPU 1 executes a cell-library-for-statistical-timing-analysis creating program 6 as a computer program for creating a cell library for statistical timing analysis according to the first embodiment. The display unit 4 is a display device such as a liquid crystal monitor and displays, based on an instruction from the CPU 1, output information for a designer such as an operation screen. The input unit 5 includes a mouse and a keyboard. The operation of the cell-library-for-statistical-timing-analysis creating apparatus 100 by the designer is input to the input unit 5. Information concerning the operation input to the input unit 5 is sent to the CPU 1.

The cell-library-for-statistical-timing-analysis creating program 6 is stored in the ROM 2 and loaded to the RAM 3 via the bus line. The CPU 1 executes the cell-library-for-statistical-timing-analysis creating program 6 loaded in the RAM 3.

Specifically, in the cell-library-for-statistical-timing-analysis creating apparatus 100, the CPU 1 reads out, according to instruction input by the designer from the input unit 5, the cell-library-for-statistical-timing-analysis creating program 6 from the ROM 2, expands the cell-library-for-statistical-timing-analysis creating program 6 in a program storage area in the RAM 3, and executes various kinds of processing. Various kinds of input information (the element connection information D11, the characterization target signal transition time ratio information D12, the delay/signal transition time average information D13, the variation information D14, the transistor information D15, and the cell logic information D16) are input via an external storage device or the like. The CPU 1 executes the various kinds of processing using the various kinds of input information and temporarily stores generated various data (including the delay variation ratio library D10) in a data storage area formed in the RAM 3. The delay variation ratio library D10 can be output to the external storage device or the like. The cell-library-for-statistical-timing-analysis creating program 6 can be stored in a storage device such as a disk. The cell-library-for-statistical-timing-analysis creating program 6 can be loaded to the storage device such as a disk.

The cell-library-for-statistical-timing-analysis creating program 6 executed by the cell-library-for-statistical-timing-analysis creating apparatus 100 includes the respective units explained above (the group determining unit 101, the group-information storing unit 102, the group selecting unit 103, the representative-cell selecting unit 104, the signal-transition-time-ratio selecting unit 105, the output-load-capacitance/input-signal-transition-time determining unit 106, the circuit-simulation executing unit 107, the delay-variation-ratio-information storing unit 108, and the library output unit 109). The respective units are loaded onto a main storage device and the group determining unit 101, the group-information storing unit 102, the group selecting unit 103, the representative-cell selecting unit 104, the signal-transition-time-ratio selecting unit 105, the output-load-capacitance/input-signal-transition-time determining unit 106, the circuit-simulation executing unit 107, the delay-variation-ratio-information storing unit 108, and the library output unit 109 are generated on the main storage device.

The cell-library-for-statistical-timing-analysis creating program 6 executed by cell-library-for-statistical-timing-analysis creating apparatus 100 according to the first embodiment can be stored on a computer connected to a network such as the Internet and provided by being downloaded through the network. The cell-library-for-statistical-timing-analysis creating program 6 executed by the cell-library-for-statistical-timing-analysis creating apparatus 100 can be provided or distributed through the network such as the Internet. The cell-library-for-statistical-timing-analysis creating program 6 according to the first embodiment can be incorporated in a ROM or the like in advance and provided to the cell-library-for-statistical-timing-analysis creating apparatus 100 according to the first embodiment. As explained above, according to the first embodiment, the relation between the value obtained by dividing the output signal transition time by the input signal transition time and the value obtained by dividing the delay variation amount by the delay average is created as the library for statistical timing analysis. Therefore, because this relation is the same in cells having the same topology, only one cell among a plurality of cells having the same topology only has to be characterized. It is possible to create a cell library for statistical timing analysis with characterization time substantially reduced without deteriorating accuracy of the statistical timing analysis. It is possible to reduce the size of the cell library for statistical timing analysis.

In the above explanation, the relation between the signal transition time ratio as the value obtained by dividing the output signal transition time by the input signal transition time and the delay variation ratio as the value obtained by dividing the delay variation amount by the delay average value is represented as the cell library for statistical analysis. However, instead of the delay variation ratio, any value can be used as long as the value is a value (delay variation information) based on the delay variation amount and the delay average. For example, an inverse ratio of the delay variation ratio can be used. Instead of the signal transition time ratio, any value can be used as long as the value is a value (signal transition time information) based on the output signal transition time and the input signal transition time. For example, an inverse ratio of the signal transition time ratio can be used.

A second embodiment of the present invention is explained below. According to the second embodiment, it is possible to execute the statistical timing analysis using the delay variation ratio library created in the first embodiment. Information same as that in the first embodiment is denoted by the same reference numerals and redundant explanation of the information is omitted.

Figure 13:
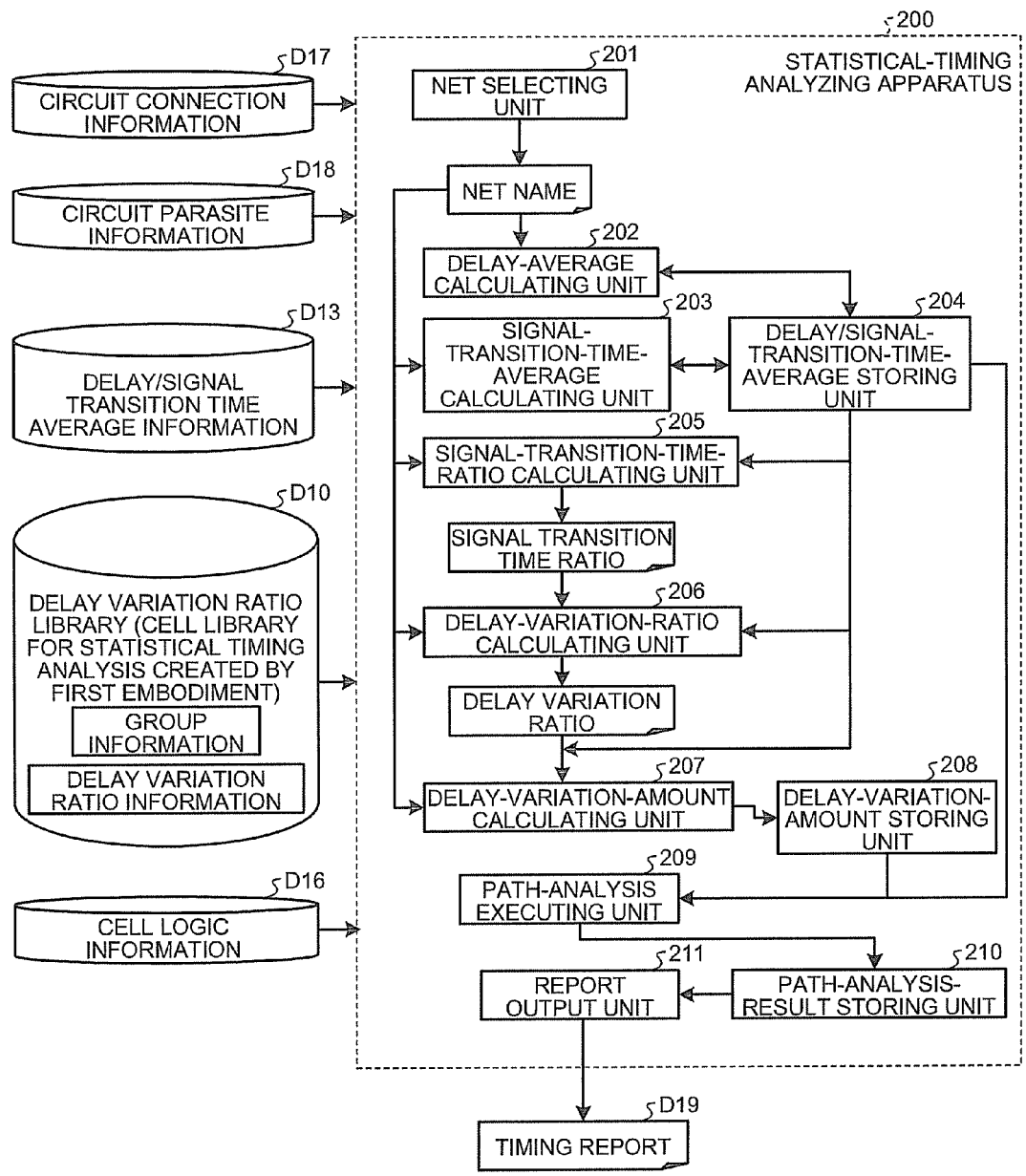
FIG. 13 is a block diagram of the configuration of a statistical-timing analyzing apparatus according to a second embodiment of the present invention.

FIG. 13 is a block diagram for explaining the configuration of a statistical-timing analyzing apparatus for executing the statistical timing analysis using the delay variation ratio library D10. The statistical-timing analyzing apparatus receives the input of circuit connection information D17, circuit parasite information D18, the delay/signal transition time average information D13, the cell logic information D16, and the delay variation ratio library D10 and outputs a timing report D19.

The circuit connection information D17 is connection information of cells in a circuit, for example, a netlist described in a circuit description language such as Verilog HDL or VHDL.

The circuit parasite information D18 is connection information of parasitic elements (a resistor and a capacitor) in the circuit, for example, a netlist described in SPEF or DSPF.

The delay variation ratio library D10 is a delay library for statistical timing analysis created according to the first embodiment and includes group information and delay variation ratio information.

A statistical-timing analyzing apparatus 200 includes, as components for creating the timing report D19 from the various kinds of input information and outputting the timing report D19, a net selecting unit 201, a delay-average calculating unit 202, a signal-transition-time-average calculating unit 203, a delay/signal-transition-time-average storing unit 204, a signal-transition-time-ratio calculating unit 205, a delay-variation-ratio calculating unit 206, a delay-variation-amount calculating unit 207, a delay-variation-amount storing unit 208, a path-analysis executing unit 209, a path-analysis-result storing unit 210, and a report output unit 211.

Figure 14:
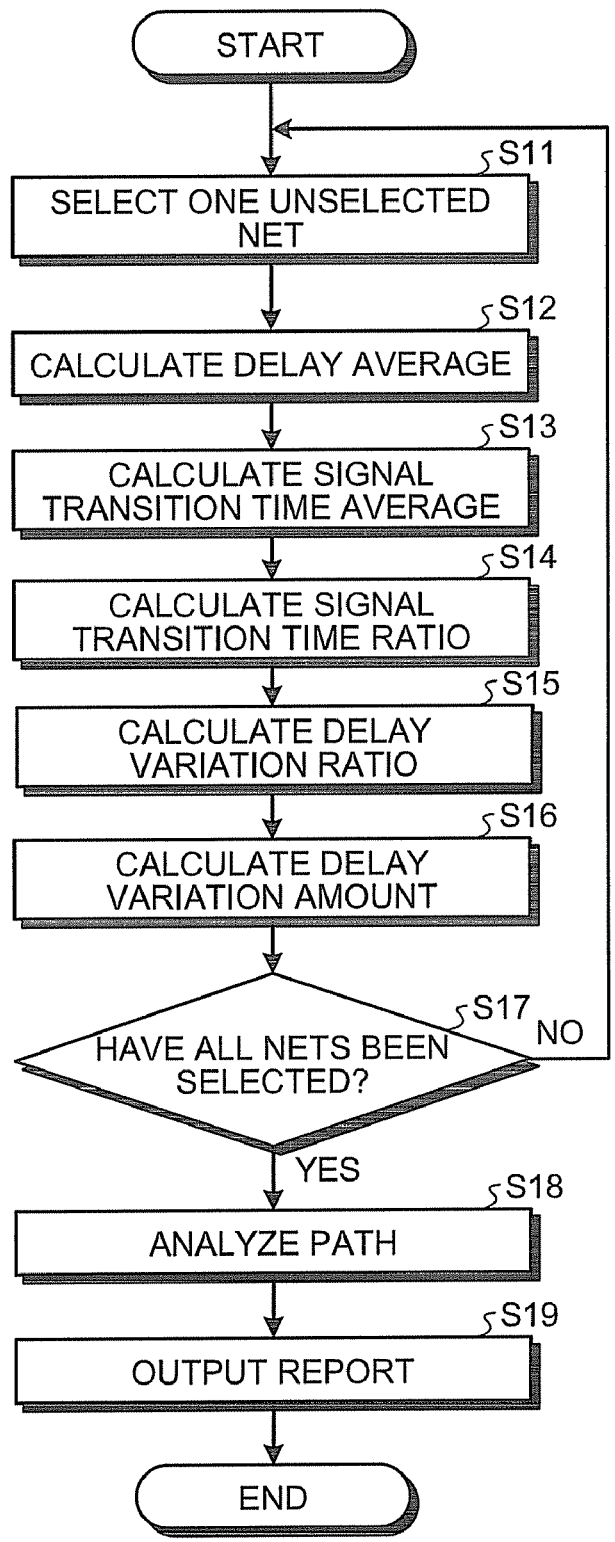
FIG. 14 is a flowchart for explaining a statistical-timing analyzing method according to the second embodiment.

FIG. 14 is a flowchart for explaining a statistical-timing analyzing method executed by the statistical-timing analyzing apparatus 200. The operation of the statistical-timing analyzing apparatus 200 is explained below with reference to the flowchart.

First, the net selecting unit 201 selects one net out of nets written in the circuit connection information D17 (step S11). Steps S11 to S17 form a loop for executing operation for calculating, for each of nets forming a path, a delay average and a delay variation amount of a cell arranged in a pre-stage of the net according to processing at steps S12 to S16. At step S11, the net selecting unit 201 sequentially selects unselected nets, i.e., nets on which the processing at steps S12 to S16 is not executed. The nets are selected in order from one nearest to an input port of a circuit.

Subsequently, the delay-average calculating unit 202 calculates a delay average (of a cell arranged in a pre-stage) of the selected net based on the circuit connection information D17, the circuit parasitic information D18, the delay/signal transition time average information D13, and a signal transition time average stored in the delay/signal transition time average storing unit 204 (i.e., input signal transition time input to the cell arranged in the pre-stage of the selected net) and stores the calculated delay average in the delay/signal-transition-time-average storing unit 204 (step S12).

Subsequently, the signal-transition-time-average calculating unit 203 calculates output signal transition time (of the cell arranged in the pre-stage) of the selected net based on the circuit connection information D17, the circuit parasitic information D18, the delay/signal transition time average information D13, and the signal transition time average stored in the delay/signal-transition-time-average storing unit 204 (i.e., the input signal transition time input to the cell arranged in the pre-stage of the selected net) and stores the calculated output signal transition time in the delay/signal-transition-time-average storing unit 204 as a signal transition time average (step S13). The calculated output signal transition time stored as the signal transition time average is used as input signal transition time of a signal input to (a cell arranged in a pre-stage of) the next net.

Subsequently, the signal-transition-time-ratio calculating unit 205 calculates a signal transition time ratio using the input signal transition time and the output signal transition time stored in the delay/signal-transition-time-average storing unit 204 (step S14). The signal transition time ratio $\text{Slew}_{ratio}$ is calculated by using Formula (I) based on the input signal transition time $\text{Slew}_{in}$ and the output signal transition time $\text{Slew}_{out}$.

Subsequently, the delay-variation-ratio calculating unit 206 calculates a delay variation ratio from the signal transition time ratio, the group information, and the delay variation ratio information (step S15). The delay variation ratio information is information of a table format (a lookup table) for calculating a delay variation ratio $\text{Delay}_{ratio}$ from the signal transition time ratio $\text{Slew}_{ratio}$ for each of variation causes. Therefore, when lookup tables with respect to the variation causes L, W, and Vth are respectively represented as $fL(\text{Slew}_{ratio})$, $fW(\text{Slew}_{ratio})$, and $fVth(\text{Slew}_{ratio})$, delay variation ratios $\text{Delay}_{ratio\text{-}L}$, $\text{Delay}_{ratio\text{-}W}$, and $\text{Delay}_{ratio\text{-}Vth}$ with respect to the variation causes L, W, and Vth are respectively calculated by the following formulas:

$$\text{Delay}_{ratio\text{-}L} = fL(\text{Slew}_{ratio}) \quad (5)$$

$$\text{Delay}_{ratio\text{-}W} = fW(\text{Slew}_{ratio}) \quad (6)$$

$$\text{Delay}_{ratio\text{-}Vth} = fVth(\text{Slew}_{ratio}) \quad (7)$$

Subsequently, the delay-variation-amount calculating unit 207 calculates a delay variation amount of the selected net based on the delay variation ratio and the delay average stored in the delay/signal-transition-time-average storing unit 204 and stores the calculated delay variation amount in the delay-variation-amount storing unit 208 (step S16). Delay variations $\text{Delay}_{L\sigma}$, $\text{Delay}_{W\sigma}$, and $\text{Delay}_{Vth\sigma}$ with respect to the variation causes L, W, and Vth are calculated from a delay average $\text{Delay}_a$ and the delay variation ratio by the following formulas:

$$\text{Delay}_{L\sigma} = \text{Delay}_{ratio\text{-}L} * \text{Delay}_{ave} \quad (8)$$

$$\text{Delay}_{W\sigma} = \text{Delay}_{ratio\text{-}W} * \text{Delay}_{ave} \quad (9)$$

$$\text{Delay}_{Vth\sigma} = \text{Delay}_{ratio\text{-}Vth} * \text{Delay}_{ave} \quad (10)$$

Subsequently, the net selecting unit 201 determines whether all the nets written in the circuit connection information D17 have been selected (step S17). When there is an unselected net ("No" at step S17), the operation shifts to step S11. When all the nets have been selected ("Yes" at step S17), the operation shifts to step S18.

At step S18, the path-analysis executing unit 209 performs calculation of a path delay based on the circuit connection information D17, the cell logic information D16, and the information stored in the delay/signal-transition-time-average storing unit 204 and the delay-variation-amount storing unit 208 (step S18). The calculation of the path delay is performed by adding up delays from the start point to the end point of a path. The addition is performed by adding up the delay averages $\text{Delay}_{ave}$, $\text{Delay}_{L\sigma}$, $\text{Delay}_{W\sigma}$, and $\text{Delay}_{Vth\sigma}$. For example, formulas for adding up delays of two nets are as follows:

$$\text{Delay}_{ave\_path} = \text{Delay}_{ave1} + \text{Delay}_{ave2} \quad (11)$$

$$\text{Delay}_{L\sigma\_path} = \text{Delay}_{L\sigma1} + \text{Delay}_{L\sigma2} \quad (12)$$

$$\text{Delay}_{W\sigma\_path} = \text{Delay}_{W\sigma1} + \text{Delay}_{W\sigma2} \quad (13)$$

$$\text{Delay}_{Vth\sigma\_path} = \text{Delay}_{Vth\sigma1} + \text{Delay}_{Vth\sigma2} \quad (14)$$

The report output unit 211 outputs, in a text format, the information concerning the path delay stored in the path-analysis-result storing unit 210 (step S19). For example, in general, a circuit designer checks a path delay average $\text{Delay}_{ave\_path}$ and a path delay standard deviation $\text{Delay}_{\sigma\_path}$. The path delay standard deviation $\text{Delay}_{\sigma\_path}$ is calculated by the following formula:

$$\text{Delay}_{\sigma\_path} = \text{sqrt}\{(\text{Delay}_{L\sigma\_path})^2 + (\text{Delay}_{W\sigma\_path})^2 + (\text{Delay}_{Vth\sigma\_path})^2\} \quad (15)$$

Figure 15:
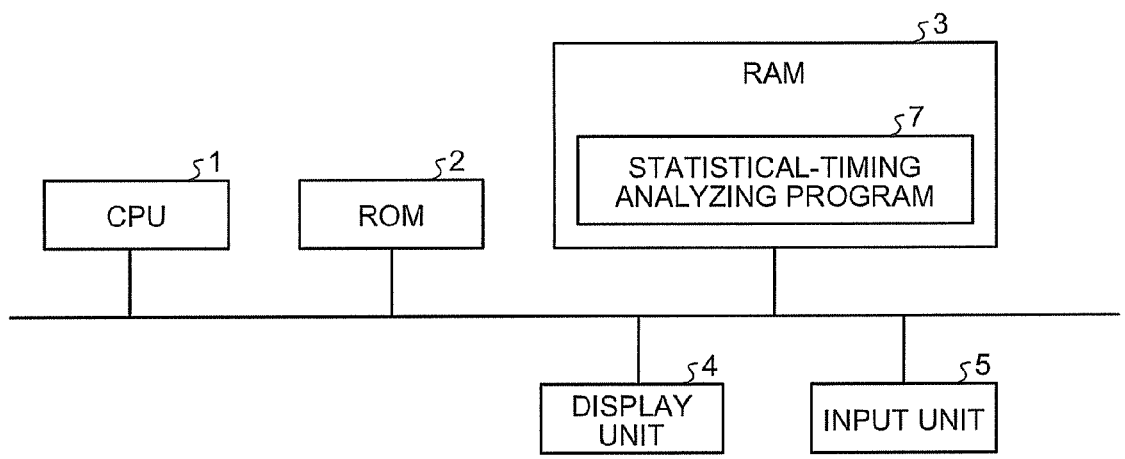
FIG. 15 is a diagram for explaining the hardware configuration of the statistical-timing analyzing apparatus according to the second embodiment.

The statistical-timing analyzing apparatus 200 can be realized by a computer having a normal hardware configuration. FIG. 15 is a diagram of the hardware configuration of the statistical-timing analyzing apparatus 200. Like the cell-library-for-statistical-timing-analysis creating apparatus 100, the statistical-timing analyzing apparatus 200 includes the CPU 1, the ROM 2, the RAM 3, the display unit 4, and the input unit 5. The CPU 1, the ROM 2, the RAM 3, the display unit 4, and the input unit 5 are connected via a bus line.

The CPU 1 executes a statistical-timing analyzing program 7 as a computer program for performing the statistical timing analysis. The statistical-timing analyzing program 7 is stored in the ROM 2 and loaded to the RAM 3 via the bus line. The CPU 1 executes the statistical-timing analyzing program 7 loaded in the RAM 3. Specifically, in the statistical-timing analyzing apparatus 200, the CPU 1 reads out, according to instruction input by the designer from the input unit 5, the statistical-timing analyzing program 7 from the ROM 2, expands the statistical-timing analyzing program 7 in the program storage area in the RAM 3, and executes various kinds of processing. The various kinds of input information (the circuit connection information D17, the circuit parasite information D18, the delay/signal transition time average information D13, the cell logic information D16, and the delay variation ratio library D10) are input via an external storage device or the like. The CPU 1 executes the various kinds of processing using the various kinds of input information and temporarily stores generated various data (including the timing report D19) in the data storage area formed in the RAM 3. The timing report D19 can be output to the external storage device or the like. The timing report D19 can be print-output by a printing apparatus or the like. The timing report D19 can be display-output to the display unit 4. The statistical-timing analyzing program 7 can be stored in a storage device such as a disk. The statistic timing analyzing program 7 can be loaded to the storage device such as a disk.

The statistical-timing analyzing program 7 executed by the statistical-timing analyzing apparatus 200 according to the second embodiment includes the respective units explained above (the net selecting unit 201, the delay-average calculating unit 202, the signal-transition-time-average calculating unit 203, the delay/signal-transition-time-average storing unit 204, the signal-transition-time-ratio calculating unit 205, the delay-variation-ratio calculating unit 206, the delay-variation-amount calculating unit 207, the delay-variation-amount storing unit 208, the path-analysis executing unit 209, the path-analysis-result storing unit 210, and the report output unit 211). The respective units are loaded onto a main storage device and the net selecting unit 201, the delay-average calculating unit 202, the signal-transition-time-average calculating unit 203, the delay/signal-transition-time-average storing unit 204, the signal-transition-time-ratio calculating unit 205, the delay-variation-ratio calculating unit 206, the delay-variation-amount calculating unit 207, the delay-variation-amount storing unit 208, the path-analysis executing unit 209, the path-analysis-result storing unit 210, and the report output unit 211 are generated on the main storage device.

The statistical-timing analyzing program 7 executed by the statistical-timing analyzing apparatus 200 according to the second embodiment can be stored on a computer connected to a network such as the Internet and provided by being downloaded through the network. The statistical-timing analyzing program 7 executed by the statistical-timing analyzing apparatus 200 according to the second embodiment can be provided or distributed through the network such as the Internet. The statistical-timing analyzing program 7 according to the second embodiment can be incorporated in a ROM or the like in advance and provided to the statistical-timing analyzing apparatus 200 according to the second embodiment.

As explained above, in the second embodiment of the present invention, the statistical timing analysis can be performed at accuracy equivalent to that achieved when the cell library created in the first embodiment is used and the cell library for statistical timing analysis according to the comparative example is used.

A third embodiment of the present invention is explained below. According to the third embodiment, the cell library for statistical timing analysis according to the comparative example is created from the delay variation ratio library D10 created in the first embodiment and the statistical timing analysis is executed based on the created cell library according to the comparative example.

Figure 16:
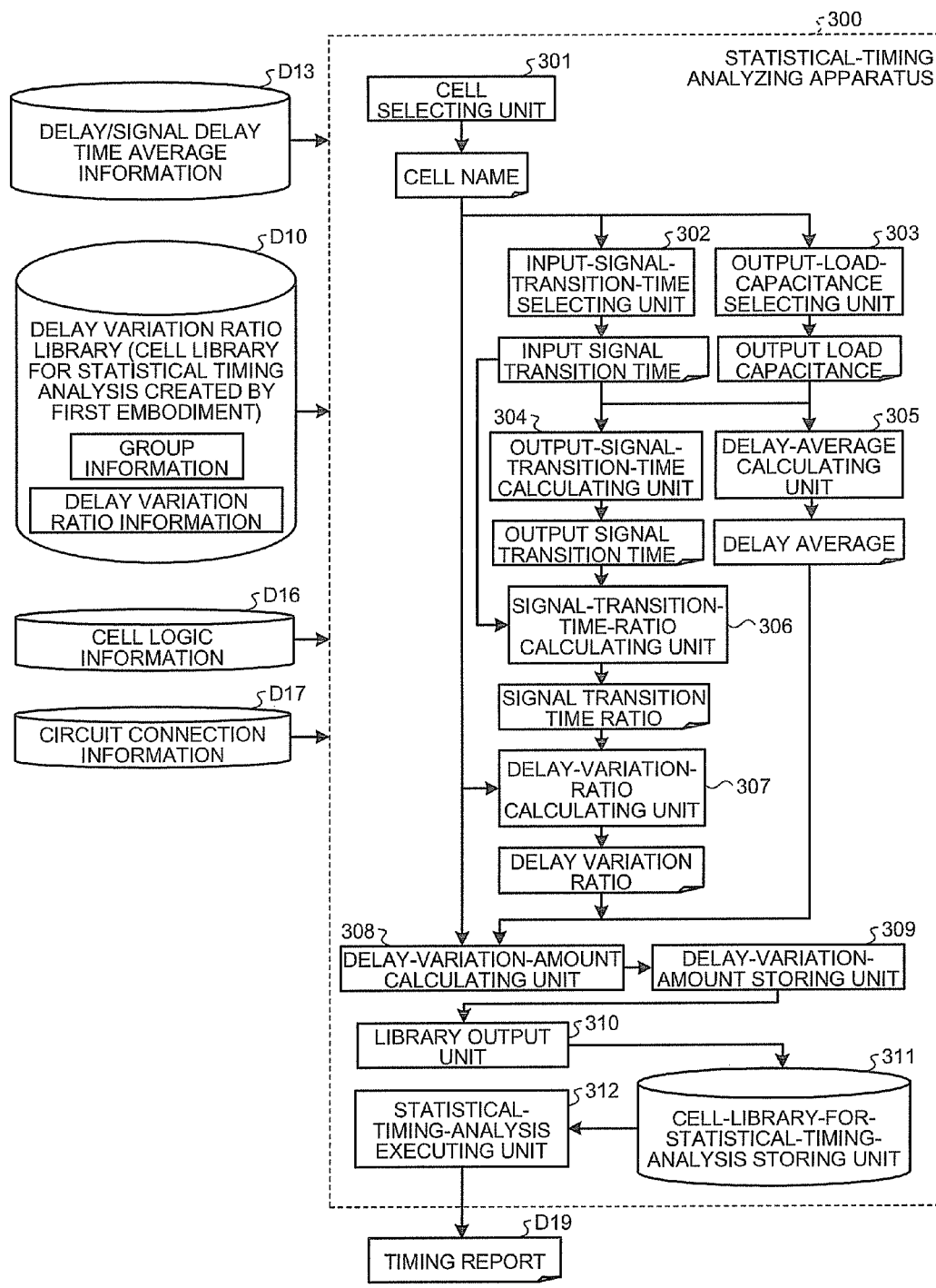
FIG. 16 is a block diagram of the configuration of a statistical-timing analyzing apparatus according to a third embodiment of the present invention.

FIG. 16 is a block diagram for explaining the configuration of a statistical-timing analyzing apparatus according to the third embodiment. A statistical-timing analyzing apparatus 300 receives the input of the circuit connection information D17, the delay/signal transition time average information D13, the cell logic information D16, and the delay variation ratio library D10 and outputs the timing report D19.

The statistical-timing analyzing apparatus 300 includes a cell selecting unit 301, an input-signal-transition-time selecting unit 302, an output-load-capacitance selecting unit 303, an output-signal-transition-time calculating unit 304, a delay-average calculating unit 305, a signal-transition-time-ratio calculating unit 306, a delay-variation-ratio calculation unit 307, a delay-variation-amount calculating unit 308, a delay-variation-amount storing unit 309, a library output unit 310, a library-for-statistical-timing-analysis storing unit 311, and a statistical-timing-analysis executing unit 312.

Figure 17:
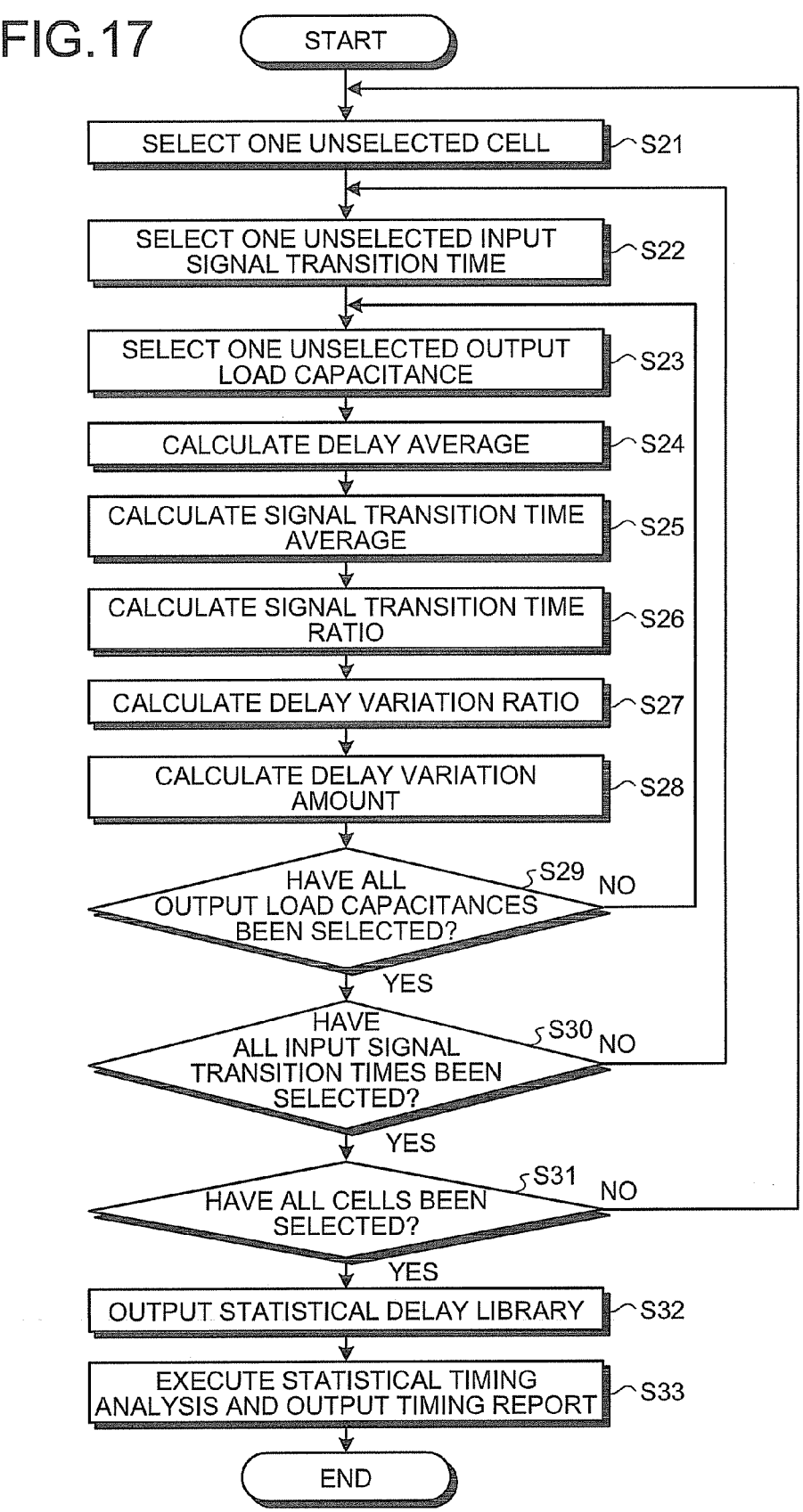
FIG. 17 is a flowchart for explaining a statistical-timing analyzing method according to the third embodiment.

FIG. 17 is a flowchart for explaining a statistical-timing analyzing method executed by the statistical-timing analyzing apparatus 300. The operation of the statistical-timing analyzing apparatus 300 is explained below with reference to the flowchart.

First, the cell selecting unit 301 selects one cell out of the cells stored in the delay/signal transition time average information D13 (step S21). The input-signal-transition-time selecting unit 302 selects one input signal transition time $Slew_{in}$ out of the signal transition time averages stored in the delay/signal transition time average information D13 (step S22). The output-load-capacitance selecting unit 303 selects one output load capacitance $C_{load}$ out of the output load capacities stored in the delay/signal transition time average information D13 (step S23).

Subsequently, the delay-average calculating unit 305 calculates, referring to the delay/signal transition time average information D13, the delay average $Delay_{ave}$ corresponding to the input signal transition time $Slew_{in}$ and the output load capacitance $C_{load}$ selected at steps S22 and S23 (step S24). The output-signal-transition-time calculating unit 304 calculates, referring to the delay/signal transition time average information D13, the output signal transition time $Slew_{out}$ corresponding to the input signal transition time $Slew_{in}$ and the output load capacitance $C_{load}$ (step S25).

Subsequently, the signal-transition-time-ratio calculating unit 306 calculates, based on Formula (1), the signal transition time ratio $Slew_{ratio}$ from the input signal transition time $Slew_{in}$ and the output signal transition time $Slew_{out}$ (step S26). The delay-variation-ratio calculating unit 307 calculates, using Formulas (5) to (7), the delay variation ratios $Delay_{ratio\_L}$, $Delay_{ratio\_W}$, and $Delay_{ratio\_Vth}$ from the signal transition time ratio $Slew_{ratio}$, the group information, and the delay variation ratio information (step S27).

Subsequently, the delay-variation-amount calculating unit 308 calculates, based on the delay average calculated by the delay-average calculating unit 305, the delay variation amounts $Delay_{Lo}$, $Delay_{Wo}$, and $Delay_{Vtho}$ of the selected net and stores the delay variation amounts $Delay_{Lo}$, $Delay_{Wo}$, and $Delay_{Vtho}$ in the delay-variation-amount storing unit 309 (step S28). The delay-variation-amount calculating unit 308 calculates delay variation amounts concerning the respective variation types using Formulas (8) to (10).

The output-load-capacitance selecting unit 303 determines whether all the output load capacities stored in the delay/signal transition time average information D13 have been selected (step S29). When there is an unselected output load capacitance ("No" at step S29), the operation shifts to step S23. When the output-load-capacitance selecting unit 303 determines that all the output load capacities stored in the delay/signal transition time average information D13 have been selected ("Yes" at step 529), the input-signal-transition-time selecting unit 302 determines whether all the signal transition time averages stored in the delay/signal transition time average information D13 have been selected (step S30). When there is an unselected signal transition time average ("No" at step S30), the operation shifts to step S22. When the input-signal-transition-time selecting unit 302 determines that all the signal transition time averages have been selected ("Yes" at step S30), the cell selecting unit 301 determines whether all the cells stored in the delay/signal transition time average information D13 have been selected (step S31). When there is an unselected cell ("No" at step S31), the operation shifts to step S21. When the cell selecting unit 301 determines that all the cells have been selected ("Yes" at step S31), the operation shifts to step S32

The calculated delay average, the signal transition time average, and the delay variation amount are stored in, for example, a table lookup format shown in FIG. 18 by cell, by signal transition direction, by variation cause, by input signal transition time, and by output load capacitance. Information concerning the stored delay variation amount is the same as the cell library for statistical timing analysis according to the comparative example explained with reference to FIG. 1. A delay variation amount can be calculated from input signal transition time (in the figure, shown as signal transition time) and an output load capacitance. At step S32, the library output unit 310 outputs, in a library format executable in the statistical-timing-analysis executing unit 312, the information stored in the delay-variation-amount storing unit 309 and the cell logic information D16 to the cell-library-for-statistical-timing-analysis storing unit 309.

The statistical-timing-analysis executing unit 312 executes the statistical timing analysis based on the cell library for statistical timing analysis output to the cell-library-for-statistical-timing-analysis storing unit 309 and outputs a result of the statistical timing analysis as the timing report D19 (step S33). With the cell library for statistical timing analysis output to the cell-library-for-statistical-timing-analysis storing unit 309, a delay variation amount can be calculated with search keys same as those of the cell library according to the comparative example. Therefore, a general (commercially available) statistical timing analyzing tool can be used as the statistical-timing-analysis executing unit 312.

The statistical-timing analyzing apparatus 300 can be realized by a computer having a normal hardware configuration. The hardware configuration of the statistical-timing analyzing apparatus 300 is completely the same as that in the second embodiment. Therefore, the hardware configuration in the second embodiment shown in FIG. 15 is referred to below.

The CPU 1 executes the statistical-timing analyzing program 7 as a computer program for performing the statistical timing analysis. The statistical-timing analyzing program 7 is stored in the ROM 2 and loaded to the RAM 3 via the bus line. The CPU 1 executes the statistical-timing analyzing program 7 loaded in the RAM 3. Specifically, in the statistical-timing analyzing apparatus 300, the CPU 1 reads out, according to instruction input by the designer from the input unit 5, the statistical-timing analyzing program 7 from the ROM 2, expands the statistical-timing analyzing program 7 in the program storage area in the RAM 3, and executes various kinds of processing. The various kind of input information (the circuit connection information D17, the delay/signal transition time average information D13, the cell logic information D16, and the delay variation ratio library D10) are input via an external storage device or the like. The CPU 1 executes the various kinds of processing using the various kinds of input information and temporarily stores generated various data (including the timing report D19) in the data storage area formed in the RAM 3. The timing report D19 can be output to the external storage device or the like. The timing report D19 can be print-output by a printing apparatus or the like. The timing report D19 can be display-output to the display unit 4. The statistical-timing analyzing program 7 can be stored in a storage device such as a disk. The statistic timing analyzing program 7 can be loaded to the storage device such as a disk.

The statistical-timing analyzing program 7 executed by the statistical-timing analyzing apparatus 300 according to the third embodiment includes the respective units explained above (the cell selecting unit 301, the input-signal-transition-time selecting unit 302, the output-load-capacitance selecting unit 303, the output-signal-transition-time calculating unit 304, the delay-average calculating unit 305, the signal-transition-time-ratio calculating unit 306, the delay-variation-ratio calculation unit 307, the delay-variation-amount calculating unit 308, the delay-variation-amount storing unit 309, the library output unit 310, the library-for-statistical-timing-analysis storing unit 311, and the statistical-timing-analysis executing unit 312). The respective units are loaded onto a main storage device and the cell selecting unit 301, the input-signal-transition-time selecting unit 302, the output-load-capacitance selecting unit 303, the output-signal-transition-time calculating unit 304, the delay-average calculating unit 305, the signal-transition-time-ratio calculating unit 306, the delay-variation-ratio calculation unit 307, the delay-variation-amount calculating unit 308, the delay-variation-amount storing unit 309, the library output unit 310, the library-for-statistical-timing-analysis storing unit 311, and the statistical-timing-analysis executing unit 312 are generated on the main storage device.

The statistical-timing analyzing program 7 executed by the statistical-timing analyzing apparatus 300 according to the third embodiment can be stored in a computer connected to a network such as the Internet and provided by being downloaded through the network. The statistical-timing analyzing program 7 executed by the statistical-timing analyzing apparatus 300 according to the third embodiment can be provided or distributed through the network such as the Internet. The statistical-timing analyzing program 7 according to the third embodiment can be incorporated in a ROM or the like in advance and provided to the statistical-timing analyzing apparatus 300 according to the third embodiment.

As explained above, in the third embodiment of the present invention, it is possible to perform the statistical timing analysis using the library created in the first embodiment and the general (commercially available) statistical timing analyzing tool without deteriorating analysis accuracy compared with the second embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A cell-library-for-statistical-timing-analysis creating apparatus, comprising:
 a group determining unit that groups cells as statistical timing analysis targets into groups of cells each having same topology;
 a representative-cell selecting unit that selects representative cells from the respective grouped cell groups;
 a signal-transition-time-information determining unit that sets one or more kinds of signal transition time information based on output signal transition time as transition time of an output signal from a cell and input signal transition time as transition time of an input signal to the cell;
 an output-load-capacitance/input-signal-transition-time determining unit that calculates, based on the set signal transition time information and a cell library for static timing analysis, for each of the selected representative cells, an output load capacitance and input signal transition time for each of the set kinds of signal transition time information to be used for circuit simulation;

a circuit-simulation executing unit that executes the circuit simulation using the calculated output load capacitance and input signal transition time and calculates a delay variation amount;

a delay-variation-information calculating unit that calculates delay variation information based on a delay average and the delay variation amount calculated by the circuit simulation; and a library output unit that outputs, as a cell library for statistical timing analysis, association for each of the representative cells between the signal transition time information and the delay variation information.

2. The cell-library-for-statistical-timing-analysis creating apparatus according to claim 1, wherein the cell library for static timing analysis is a table for associating the input signal transition and output load capacitance of the cells and the output signal transition time.

3. The cell-library-for-statistical-timing-analysis creating apparatus according to claim 2, wherein the output-load-capacitance/input-signal-transition-time determining unit calculates, based on the signal transition time information set by the signal-transition-time-information determining unit, input signal transition time used for the circuit simulation and output signal transition time corresponding to the input signal transition time and calculates an output load capacitance that satisfies a correspondence relation between the calculated input signal transition time to be used for the circuit simulation and the output signal transition time corresponding to the input signal transition time in the cell library for static timing analysis.

4. The cell-library-for-statistical-timing-analysis creating apparatus according to claim 3, wherein the output-load-capacitance/input-signal-transition-time determining unit binary-searches through the cell library for static timing analysis based on the calculated input signal transition time to be used for the circuit simulation and the output signal transition time corresponding to the input signal transition time to thereby calculates the output load capacitance.

5. The cell-library-for-statistical-timing-analysis creating apparatus according to claim 3, wherein the signal transition time information is a signal transition time ratio as a ratio of the input signal transition time and the output signal transition time.

6. The cell-library-for-statistical-timing-analysis creating apparatus according to claim 3, wherein the delay variation information is a delay variation ratio as a ratio of the delay variation amount and the delay average value.

7. The cell-library-for-statistical-timing-analysis creating apparatus according to claim 1, wherein the representative-cell selecting unit selects cells having smallest transistor sizes as the representative cells in the grouped respective cell groups.

8. A statistical-timing analyzing apparatus, comprising:
a net-delay analyzing unit that calculates, for each of nets forming a path, a delay average and a delay variation amount of a cell arranged in a pre-stage of the net; and
a path-delay analyzing unit that calculates a path delay of the path based on the delay average and the delay variation amount calculated for each of the nets, wherein the net-delay analyzing unit includes:
a net selecting unit that selects a net forming the path;
a delay-average/output-signal-transition-time calculating unit that calculates a delay average and output signal transition time referring to a cell library for static timing analysis with input signal transition time to a cell arranged in a pre-stage of the selected net and an output load capacitance of the cell set as search keys;

a signal-transition-time-ratio calculating unit that divides the calculated output signal transition time by the input signal transition time to calculate a signal transition time ratio;

a delay-variation-ratio calculating unit that calculates a delay variation ratio referring to a cell library for statistical timing analysis with the calculated signal transition time ratio set as a search key; and a delay-variation-amount calculating unit that multiplies the calculated delay average and the calculated delay variation ratio together to calculate a delay variation amount, wherein the cell library for statistical timing analysis is created by a cell-library-for-statistical-timing-analysis creating apparatus including:

a group determining unit that groups cells as statistical timing analysis targets into groups of cells each having same topology;

a representative-cell selecting unit that selects representative cells from the respective grouped cell groups;

a signal-transition-time-information determining unit that sets one or more signal transition time ratios as ratios of the input signal transition time and the output signal transition time;

an output-load-capacitance/input-signal-transition-time determining unit that calculates, based on the signal transition time ratios set by the signal-transition-time-information determining unit and the cell library for static timing analysis, for each of the selected representative cells, an output load capacitance and input signal transition time for each of the set signal transition time ratios to be used for circuit simulation;

a circuit-simulation executing unit that executes the circuit simulation using the output load capacitance and the input signal transition time calculated by the output-load-capacitance/input-signal-transition-time determining unit and calculates a delay variation amount;

a delay-variation-information calculating unit that calculates a delay variation ratio as a ratio of the delay variation amount calculated by the circuit-simulation executing unit and the delay average; and a library output unit that outputs, as the cell library for statistical timing analysis, association for each of the representative cells between the signal transition time ratio and the delay variation ratio calculated by the delay-variation-information calculating unit.

9. The statistical-timing analyzing apparatus according to claim 8, wherein the cell library for static timing analysis is a table for associating the input signal transition and output load capacitance of the cells and the output signal transition time.

10. The statistical-timing analyzing apparatus according to claim 9, wherein the output-load-capacitance/input-signal-transition-time determining unit calculates, based on the signal transition time ratios set by the signal-transition-time-information determining unit, input signal transition time used for the circuit simulation and output signal transition time corresponding to the input signal transition time and calculates an output load capacitance that satisfies a correspondence relation between the calculated input signal transition time to be used for the circuit simulation and the output signal transition time corresponding to the input signal transition time in the cell library for static timing analysis.

11. The statistical-timing analyzing apparatus according to claim 10, wherein the output-load-capacitance/input-signal-transition-time determining unit binary-searches through the cell library for static timing analysis based on the calculated input signal transition time to be used for the circuit simulation and the output signal transition time corresponding to the input signal transition time to thereby calculates the output load capacitance.

12. The statistical-timing analyzing apparatus according to claim 8, wherein
the path delay of the path calculated by the path-delay analyzing unit includes a path delay average as an average of delay times of the path and a path delay standard deviation as a standard deviation of the delay times, and
the path-delay analyzing unit integrates the calculated delay average of each of the nets forming the path to calculate the path delay average, squares the calculated delay variation amount for each of the nets forming the path, integrate the squared values and raises the integrated value to the 0.5th power to calculate the path delay standard deviation.

13. The statistical-timing analyzing apparatus according to claim 8, wherein the representative-cell selecting unit selects cells having smallest transistor sizes as the representative cells in the grouped respective cell groups.

14. A statistical-timing analyzing apparatus, comprising:
a cell-library-for-statistical-timing-analysis creating unit that creates a first cell library for statistical timing analysis, which outputs a delay variation amount with the input signal transition time and the output load capacitance set as search keys, using a second cell library for statistical timing analysis created by a cell-library-for-statistical-timing-analysis including: a group determining unit that groups cells as statistical timing analysis targets into groups of cells each having same topology; a representative-cell selecting unit that selects representative cells from the respective grouped cell groups; a signal-transition-time-information determining unit that sets one or more signal transition time ratios as ratios of input signal transition time as transition time of an input signal to a cell and output signal transition time of an output signal from the cell; an output-load-capacitance/input-signal-transition-time determining unit that calculates, based on the set signal transition time ratios and a cell library for static timing analysis, for each of the selected representative cells, an output load capacitance and input signal transition time for each of the set signal transition time ratios to be used for circuit simulation; a circuit-simulation executing unit that executes the circuit simulation using the calculated output load capacitance and input signal transition time and calculates a delay variation amount; a delay-variation-information calculating unit that calculates a delay variation ratio as a ratio of the delay variation amount calculated by the circuit simulation and the delay average; and a library output unit that outputs, as the second cell library for statistical timing analysis, association for each of the representative cells between the signal transition time ratio and the delay variation ratio; and
a statistical-timing-analysis executing unit that executes statistical timing analysis based on the first cell library for statistical timing analysis, wherein the cell-library-for-statistical-timing-analysis creating unit includes:
an input-signal-transition-time/output-load-capacitance setting unit that selects one input signal transition time and one output load capacitance out of a plurality of input signal transition times and a plurality of output load capacities, respectively;
a delay-average/output-signal-transition-time calculating unit that calculates a delay average and output signal transition time referring to the cell library for static timing analysis with the input signal transition time and the output load capacitance selected by the input-signal-transition-time/output-load-capacitance setting unit set as search keys;
a signal-transition-time-ratio calculating unit that divides the output signal transition time calculated by the delay-average/output-signal-transition-time calculating unit by the input signal transition time selected by the input-signal-transition-time/output-load-capacitance setting unit to calculate a signal transition time ratio;
a delay-variation-ratio calculating unit that calculates a delay variation ratio referring to the second cell library for statistical timing analysis with the signal transition time ratio calculated by the signal-transition-time-ratio calculating unit set as a search key; and
a delay-variation-amount calculating unit that multiplies the delay average calculated by the delay-average/output-signal-transition-time calculating unit and the delay variation ratio calculated by the delay-variation-ratio calculating unit together to calculate a delay variation amount.

15. The statistical-timing analyzing apparatus according to claim 14, wherein the cell library for static timing analysis is a table for associating the input signal transition and output load capacitance of the cells and the output signal transition time.

16. The statistical-timing analyzing apparatus according to claim 15, wherein the output-load-capacitance/input-signal-transition-time determining unit calculates, based on the signal transition time information set by the signal-transition-time-information determining unit, input signal transition time used for the circuit simulation and output signal transition time corresponding to the input signal transition time and calculates an output load capacitance that satisfies a correspondence relation between the calculated input signal transition time to be used for the circuit simulation and the output signal transition time corresponding to the input signal transition time in the cell library for static timing analysis.

17. The statistical-timing analyzing apparatus according to claim 16, wherein the output-load-capacitance/input-signal-transition-time determining unit binary-searches through the cell library for static timing analysis based on the calculated input signal transition time to be used for the circuit simulation and the output signal transition time corresponding to the input signal transition time to thereby calculates the output load capacitance.

18. The statistical-timing analyzing apparatus according to claim 14, wherein the representative-cell selecting unit selects cells having smallest transistor sizes as the representative cells in the grouped respective cell groups.

* * * * *